United States Patent [19]

Yokouchi et al.

[11] Patent Number: 5,018,784
[45] Date of Patent: May 28, 1991

[54] FLEXIBLE TOP APPARATUS OF A VEHICLE

[75] Inventors: Takahito Yokouchi; Kenji Matsumoto; Kozo Odoi, all of Hiroshima, Japan

[73] Assignee: Mazda Motor Corporation, Shinchi, Japan

[21] Appl. No.: 386,734

[22] Filed: Jul. 31, 1989

[30] Foreign Application Priority Data

Jul. 30, 1988 [JP] Japan ............................. 63-191605
Aug. 31, 1988 [JP] Japan ......................... 63-115562[U]
Aug. 31, 1988 [JP] Japan ............................. 63-218969

[51] Int. Cl.⁵ ............................................... B60J 7/06
[52] U.S. Cl. ................................. 296/219; 296/223; 296/224
[58] Field of Search .......................... 296/219, 223, 224

[56] References Cited

U.S. PATENT DOCUMENTS 2,964,598 11/1954 Ulrich ................................. 296/107

FOREIGN PATENT DOCUMENTS 0162326 7/1988 Japan ................................. 296/219

*Primary Examiner*—Dennis H. Pedder
*Attorney, Agent, or Firm*—Fish & Richardson

[57] ABSTRACT

In a roof panel connected to a vehicle body through at least a pair of left-hand and right-hand front pillars and a pair of left-hand and right-hand rear pillars, there is formed a roof opening large in size in such a manner as leaving a front header, a pair of left-hand and right-hand roof side rails, and a rear header and being surrounded by said four members. A foldable flexible top having a size as substantially large as the roof opening is provided. The flexible top is disposed to selectively take a first posture in which the roof opening is closed and a second posture in which it is contracted in a longitudinal direction of the body and placed in a contracted state, i.e., in a folded state, at a position nearby said rear header. Underneath the flexible top in the second posture, a board member supporting the flexible top is disposed, and the board member is movable between the second posture and a third posture rearward of the second posture by means of a guiding device consisting of a link mechanism and so on while the board member supports the flexible top. The third posture is set at a position in a vicinity of a lower end portion of the rear window glass panel.

20 Claims, 31 Drawing Sheets

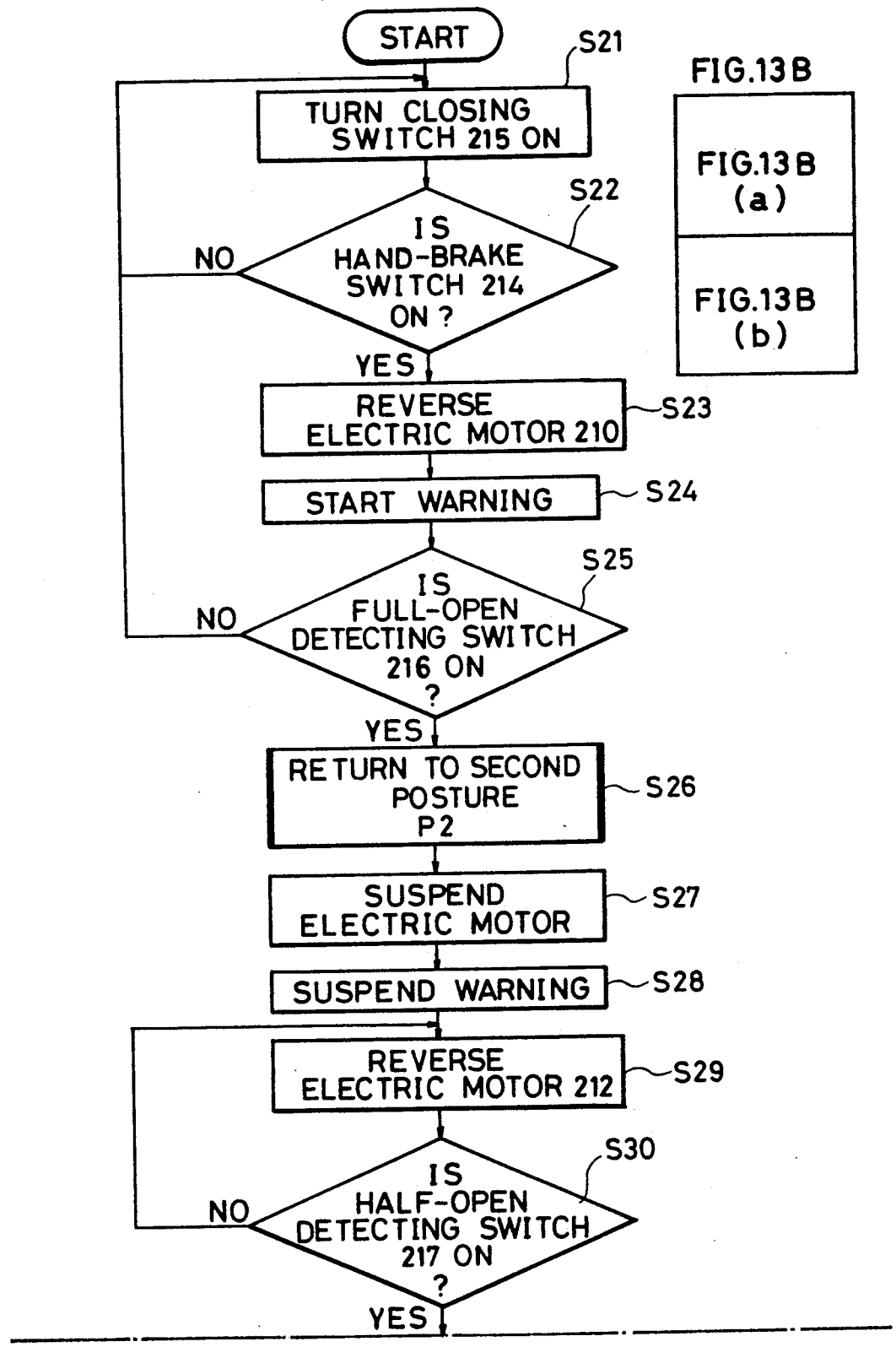

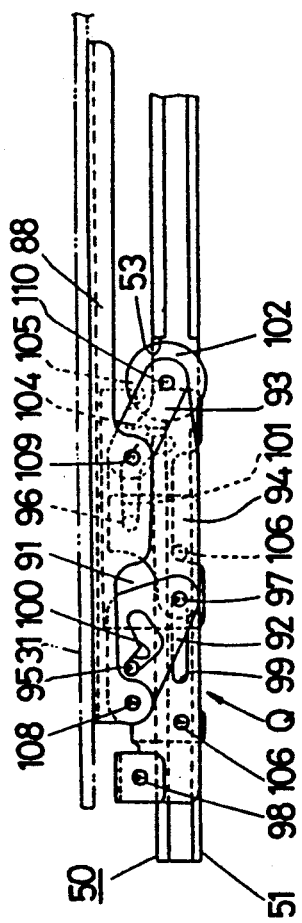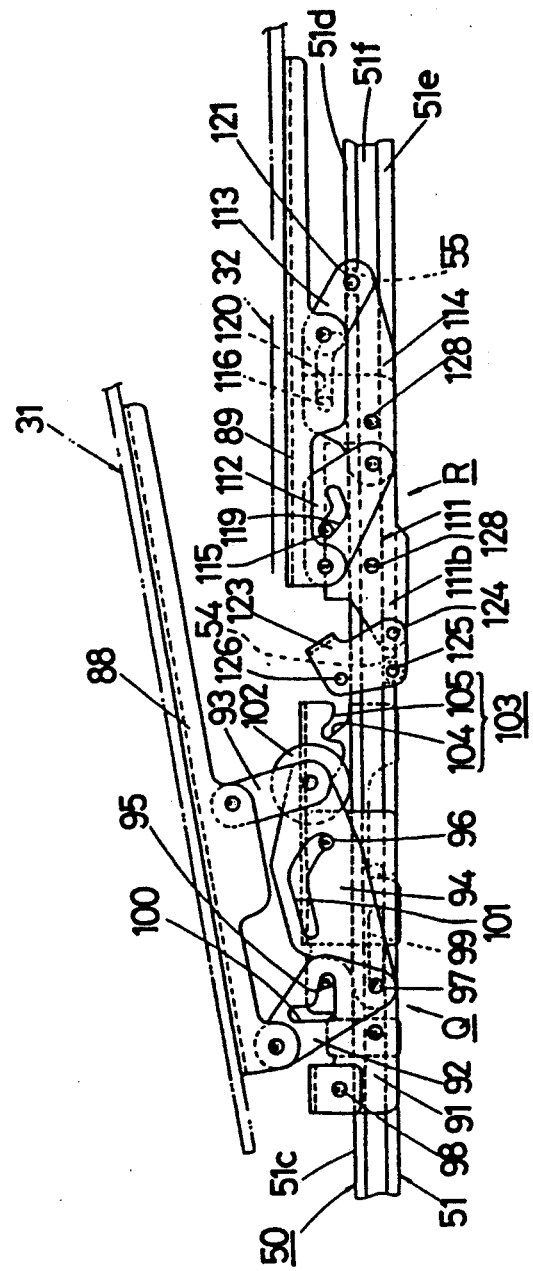

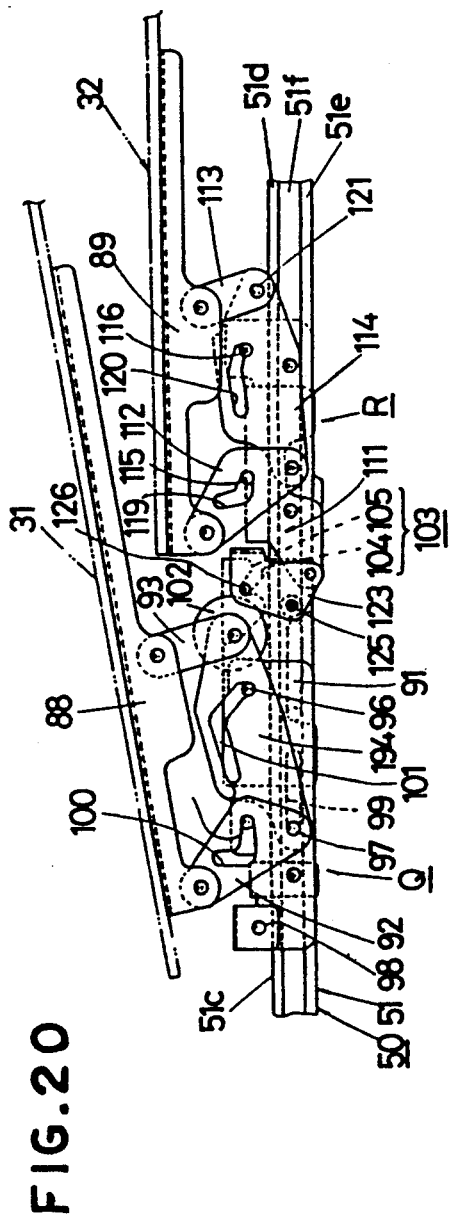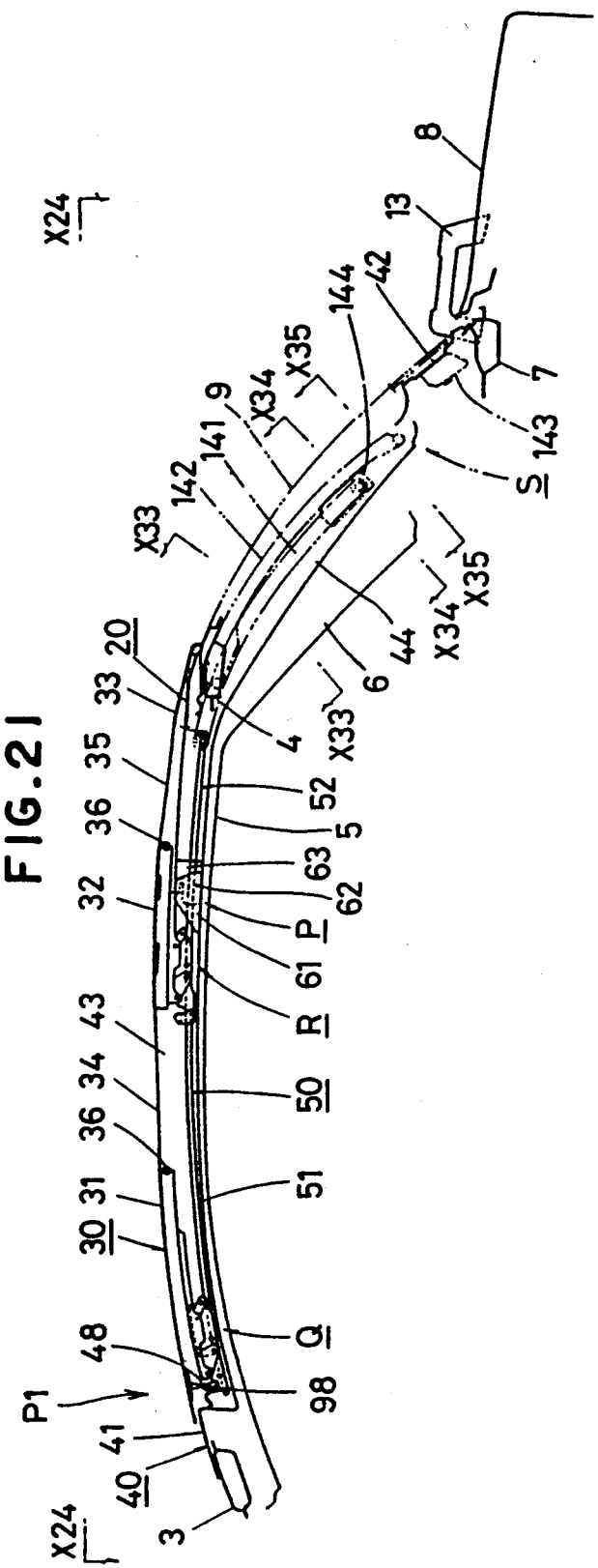

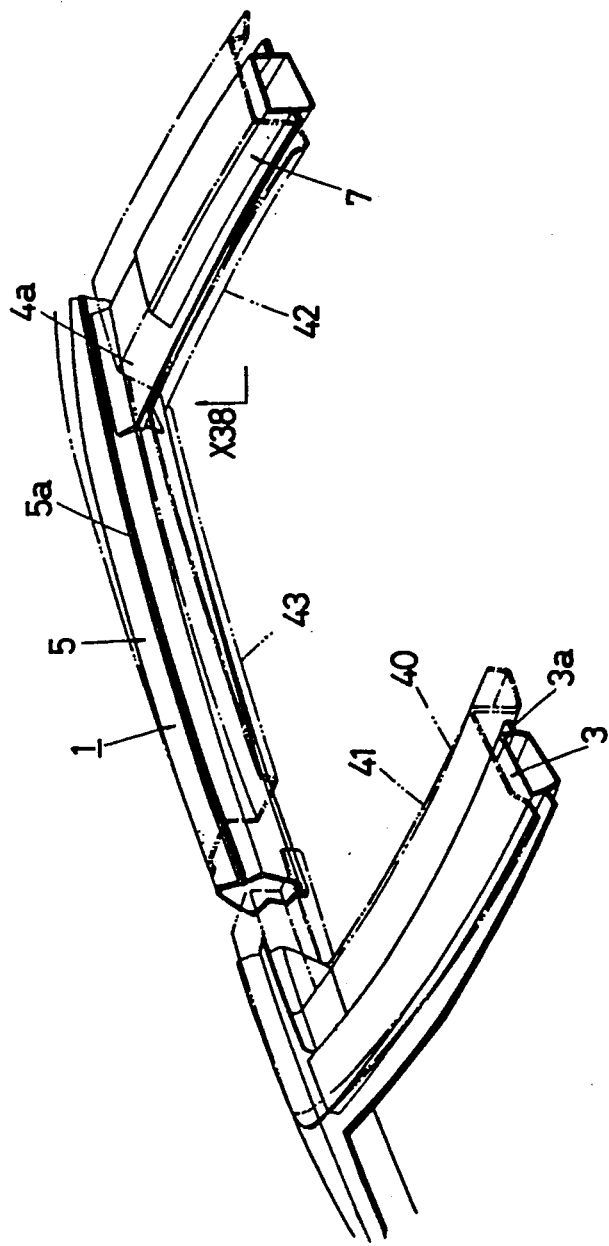
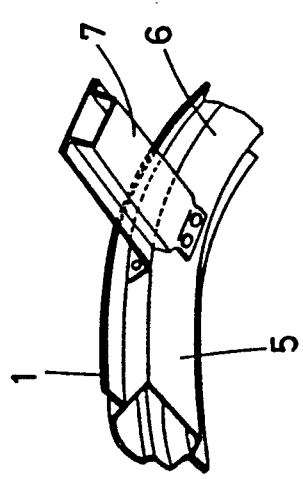

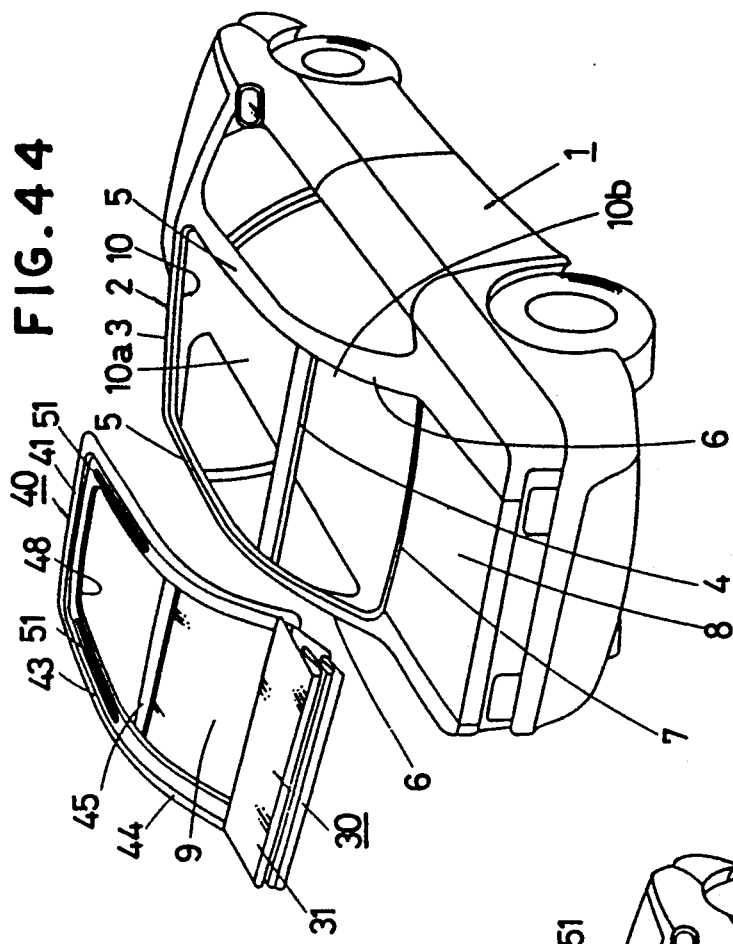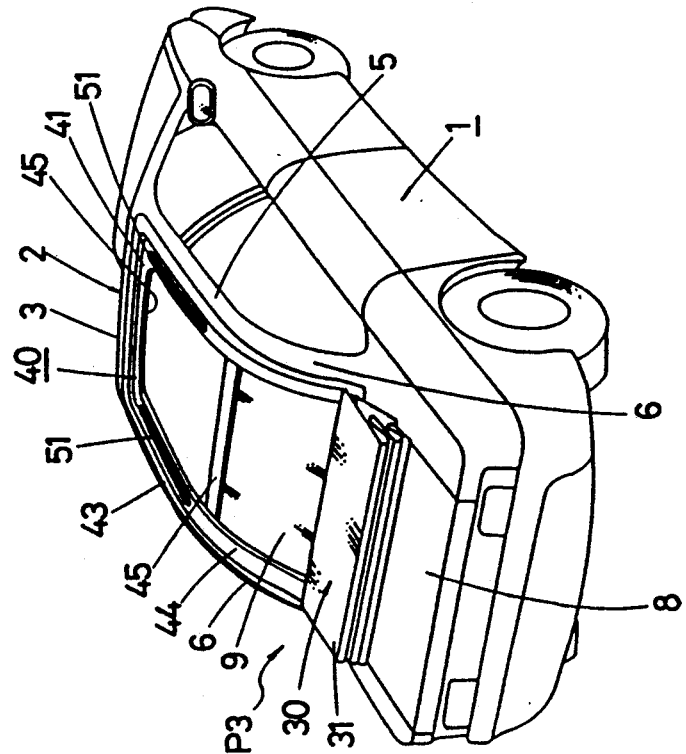

FLEXIBLE TOP APPARATUS OF A VEHICLE

BACKGROUND OF THE INVENTION

1. Field of the Invention

The present invention relates to a flexible top apparatus of a vehicle, as an automobile.

2. Description of Related Art

There is an automobile in which an upper portion of the vehicle chamber is open to thereby enjoy open air.

The automobile of the open air type requires a member for covering its vehicle chamber to be used when required or needs as when it rains. As such a member may be used a foldable or windable flexible sheet, or a top.

Representative of such an automobile is one of full open type, which may be called a Cabriole type. An automobile of full open type as disclosed in U.S. Pat. No. 4,572,570 is basically of a type designed to allow an upper portion and a rearward upper portion of its vehicle chamber are fully open. More specifically, the automobile is provided with a front window glass panel, but no rear pillar is provided which is otherwise required in order to support the roof panel and a rearward end portion of the roof panel. Although the automobile of the full open type presents the advantage that its vehicle chamber can be widely open, it poses various difficulties at the same time that a rigidity of the vehicle body is hardly ensured because neither roof panel nor rear pillar are mounted, that the flexible top should be constructed in such a shape as covering the rearward upper portion of the vehicle chamber as well as the upper portion thereof when it is brought into a closed state, thus complicating its structure, and that a sealing performance of the flexible top is poor when it closes the vehicle chamber.

There is accordingly the increasing tendency that an automobile of a flexible top type which may be called of a canvas top type (see U.K. Patent Specification No. 1,315,364). The automobile of flexible top type or canvas top type is such that only an opening formed on a roof panel—such an opening being referred to herein as "roof opening"—is covered (closed) or uncovered (opened) with a flexible sheet so that this type may called a flexible top or a so-called flexible roof. The automobile of this flexible top type is provided with a roof panel having a wide opening, or roof opening, connected to the vehicle body at least through front and rear pillars in such a manner that the roof opening is closed or opened with the flexible top. More specifically, the roof panel is of the type such that its whole middle portion is wide open as a roof opening except its front header, a pair of its left-hand and right-hand side rails, and its rear header. In other words, the front and rear headers and the side rails constitute a four-sided circumference of the roof opening and a front window glass panel if fixed with a pair of the left-hand and right-hand front pillars and the front header while a rear window glass panel is fixed with a pair of the left-hand and right-hand rear pillars and the rear header.

As the flexible top is in a closed state in which it fully closes the roof opening, the flexible top is designed such that its forward end is brought into abutment with the front header of the roof panel, its left-hand and right-hand side end portions are in abutment with the left-hand and right-hand roof side rails, and its rearward end is abutted with the rear header. This arrangement ensures a rigidity of the vehicle body to a sufficient extent because a framework of an upper circumference of the vehicle chamber is constituted by the left-hand and right-hand front pillars, front header, left-hand and right-hand roof side rails as well as rear header, such members being connected to each other. This structure further provides the advantage that it is simple because the flexible top is designed simply to open or close the roof opening. Furthermore, it presents the advantage that most common automobiles with a roof panel supported with front and rear pillars can be converted to those of flexible top type by small modifications. For the above reasons, recently, there is the tendency that automobiles of flexible top type increase dramatically.

The automobile of the flexible top type is designed so as to take a closed posture, or to become in a closed state, in which the roof opening is closed by fixing a rearward end portion of the flexible top to the rear header while abutting a forward end portion of the top with the front header, on the one hand, and so as to take an open posture, or to become in an open state, in which the roof opening is wide open by transferring the forward end portion of the top rearwardly to a large extent from the closed posture toward the rear header. At this open posture, the flexible top is housed or accommodated in a folded state.

For the automobiles of conventionally flexible top type, however, the flexible top in a housed state is still extended wide in a longitudinal direction so that it covers over a considerably large portion of the roof opening, thus impairing a sufficiently open feeling.

Proposals have been further made of an automobile positioned in between the flexible top (canvas top) type and the full open type. Japanese Patent Publication (Kokai) No. 162,326/1988 proposes the type in which a rearward opening surrounded by the rear header and a pair of the left-hand and right-hand rear pillars is opened or closed, too, by a top composed of a flexible sheet, in addition to the roof opening surrounded by the front header, a pair of left-hand and right-hand roof side rails, and the rear header. For this type of the automobile, the flexible top is accommodated at a position nearby or close to a lower end portion of the rearward opening so that this type is advantageous in terms of an open feeling and a resistance to air. However, it is considerably difficult to ensure a complete sealing for closing the roof opening and the rearward opening because the flexible top should close the both openings and because a plane containing the roof opening is connected to a plane containing the rearward opening at a relatively sharp angle. Furthermore, the flexible top should be considerably large enough to cover the both openings and the structure for accommodating such a large flexible top should also be rendered complicated. On top of that, the flexible top should be provided with the function as if it serves as a rear window glass, too.

SUMMARY OF THE INVENTION

Therefore, the present invention has the object to provide a flexible top apparatus of a vehicle, as automobile in which only the roof opening formed in the roof panel is opened or closed by means of the flexible top and an upper portion of its vehicle chamber can be opened.

In order to achieve the object, the present invention consists of a flexible top apparatus of a vehicle, comprising: a roof panel connected to a vehicle body through at least a pair of left-hand and right-hand front pillars and a pair of left-hand and right-hand rear pillars; a roof opening provided in the roof panel leaving a front header, a pair of left-hand and right-hand roof side rails, and a rear header and surrounded by said front header, said left-hand and right-hand roof side rails, and said rear header; a rear window glass panel fixed to said left-hand and right-hand rear pillars and said rear header; a flexible top having a size as substantially large as the roof opening in a state in which said flexible top is unfolded and expanded in a longitudinal direction of the vehicle body and being disposed to selectively take a first posture in which the roof opening is closed and a second posture in which said flexible top is contracted or folded in a longitudinal direction of the body and placed at a position in a vicinity of said rear header to open the roof opening; and a board member disposed underneath the said flexible top located in the second posture for supporting said flexible top located in the second posture; and a guide means disposed between said board member and the body for movably guiding said board member and said flexible top supported by said board member between said second posture and a third posture located rearward of said second posture. In accordance with the present invention, the flexible top apparatus as having the structure as have been briefly described hereinabove is such that the flexible top is accommodated at a position farther rearward than conventional canvas top vehicles so that the roof opening is not closed at all by the flexible top when accommodated.

It is further to be noted that the third posture in which the flexible top is placed on the board member and accommodated on the trunk lid is preferably nearby or in a vicinity of a lower end portion of the rear window glass panel. The flexible top accommodated in the third posture can prevent a resistance against air during running because it is fully behind the rear window glass panel. It is preferred to separately use a first actuator such as a motor for driving the flexible top between the first and second postures and a second actuator such as a motor for driving the flexible top and the board member between the second and third postures. In this case, the first and second actuators can produce their driving force so as to optimize an output power required separately to an appropriate level, thereby permitting a wasteless distribution of driving force and a smooth operation of opening and closing the flexible top between the first and second postures.

Other objects, advantages and features of the present invention will become apparent in the course of the description of the preferred embodiments which follows with reference to the accompanying drawings.

BRIEF DESCRIPTION OF THE DRAWINGS

FIGS. 1 to 13B(b) is directed to the first example of the vehicle top apparatus according to the present invention; in which:

FIG. 1 is a schematic view explaining the content of the present invention;

FIG. 2 is a perspective view showing an automobile to which the flexible top is applied;

FIG. 3 is a view showing an electric circuit;

FIG. 4 is a side view showing a state in which the flexible top on the board member is in the second posture;

FIG. 5 is an exploded perspective view sshowing the automobile to which the flexible top is applied;

FIG. 6 is an exploded perspective view showing a relationship of various mountings to the base frame;

FIG. 7 is a sectional view taken along the line X7—X7 line of FIG. 4;

FIG. 8 is a partially sectional perspective view showing a relationship of mountings in a vicinity of the rear window glass panel;

FIG. 9 is a perspective view showing the board member;

FIG. 10 is an exploded perspective view showing the mounting relationship of the board member with the sliding body;

FIG. 11 is a partially sectional perspective view showing the relationship in a vicinity of the board member;

FIG. 12 is a side view showing relationship of the flexible top during transfer between the first posture and the third posture; and FIGS. 13(A), 13B(a), and 13B(b) are flow charts showing a control content of a microcomputer as shown in FIG. 3.

FIGS. 14 to 45 are directed to another embodiment of the flexible top apparatus according to the present invention, in which:

FIG. 14 is a perspective view of a position regulating device mounted to the flexible top;

FIG. 15 is a side view of FIG. 14;

FIG. 16 is a view showing changes of states of FIG. 15;

FIG. 17 is an exploded perspective view showing transfer devices to be mounted to the flexible top;

FIG. 18 is a side view of FIG. 17;

FIGS. 19 and 20 are each a view showing changes of states of FIG. 18;

FIG. 21 is a longitudinal sectional view showing the essential portion;

FIGS. 22 and 23 are each a view showing changes of states of FIG. 21;

FIG. 24 is a perspective view taken along the line X24—X24 of FIG. 21;

FIG. 25 is a longitudinal sectional view taken along the line X25—X25 of FIG. 24;

FIG. 26 is a longitudinal sectional view taken along the line X26—X26 of FIG. 24;

FIG. 27 is a longitudinal sectional view taken along the line X27—X27 of FIG. 24;

FIG. 28 is a longitudinal sectional view taken along the line X28—X28 of FIG. 24;

FIG. 29 is a longitudinal sectional view taken along the line X29—X29 of FIG. 24;

FIG. 30 is a longitudinal sectional view taken along the line X30—X30 of FIG. 24;

FIG. 31 is a longitudinal sectional view taken along the line X31—X31 of FIG. 24;

FIG. 32 is a longitudinal sectional view taken along the line X32—X32 of FIG. 24;

FIG. 33 is a longitudinal sectional view taken along the line X33—X33 of FIG. 24;

FIG. 34 is a longitudinal sectional view taken along the line X34—X34 of FIG. 24;

FIG. 35 is a longitudinal sectional view taken along the line X35—X35 of FIG. 24;

FIG. 36 is a perspective view showing the rearward portion of the vehicle;

FIG. 37 is a perspective view showing the roof portion of the vehicle body;

FIG. 38 is a perspective view taken along the line X38—X38 of FIG. 37;

FIG. 39 is a perspective view showing an overall structure of a pivoting mechanism;

FIG. 40 is a diagram for explaining the construction of a drive gear unit as shown in FIG. 39;

FIG. 41 is a perspective view showing an outline of the automobile with the flexible top according to the present invention;

FIGS. 42 and 43 are each a diagram showing changes of states of FIG. 41;

FIG. 44 is an exploded perspective view showing the automobile as shown in FIG. 43; and FIG. 45 is an exploded perspective view showing a canvas top assembly as shown in FIG. 44.

DESCRIPTION OF THE PREFERRED EMBODIMENTS

The present invention will be described in detail by way of examples with reference to the accompanying drawings.

FIRST EXAMPLE

FIGS. 1 to 13 are directed to the first example of the flexible top apparatus according to the present invention.

Figure 1:
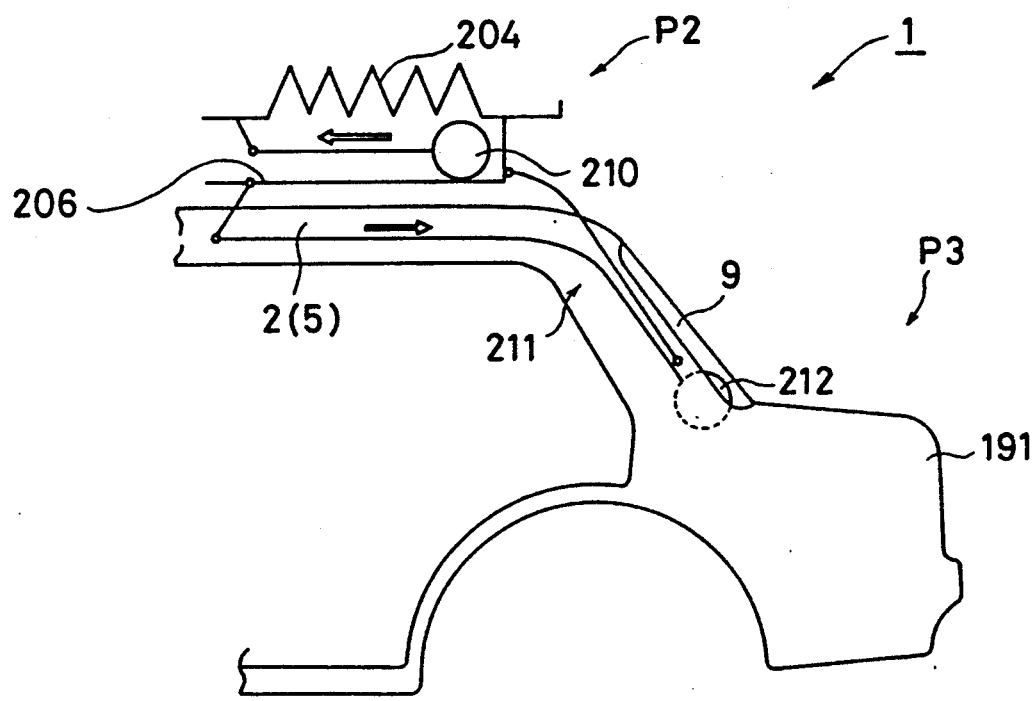
Figure 2:
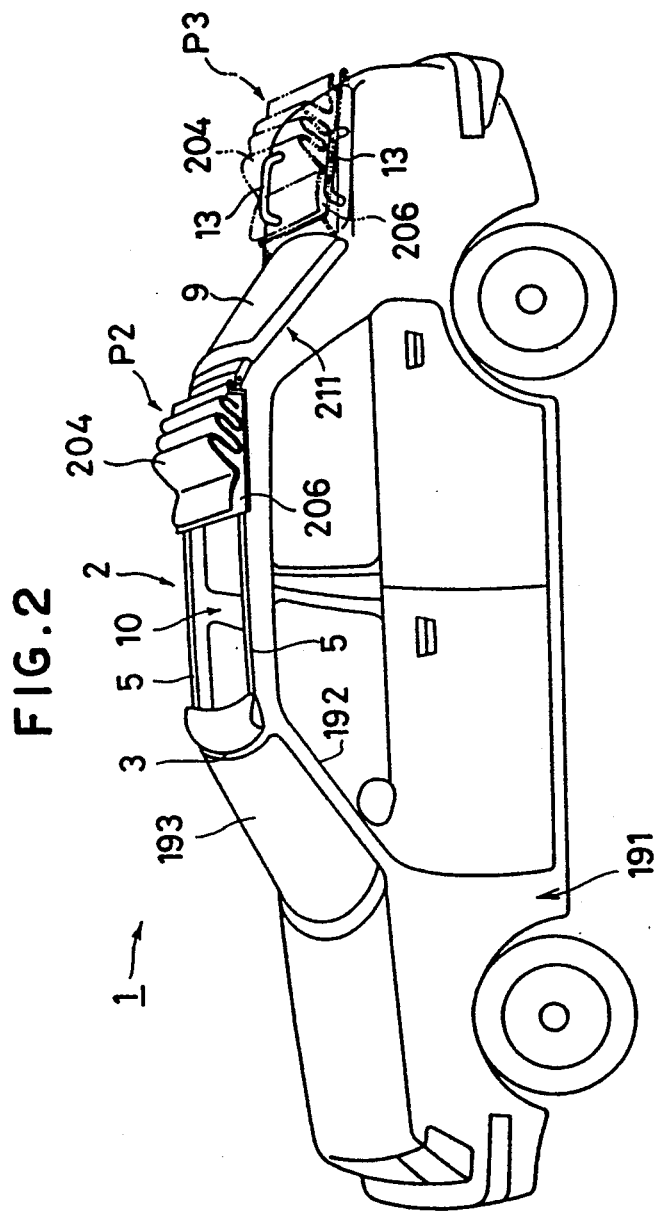
Figure 5:
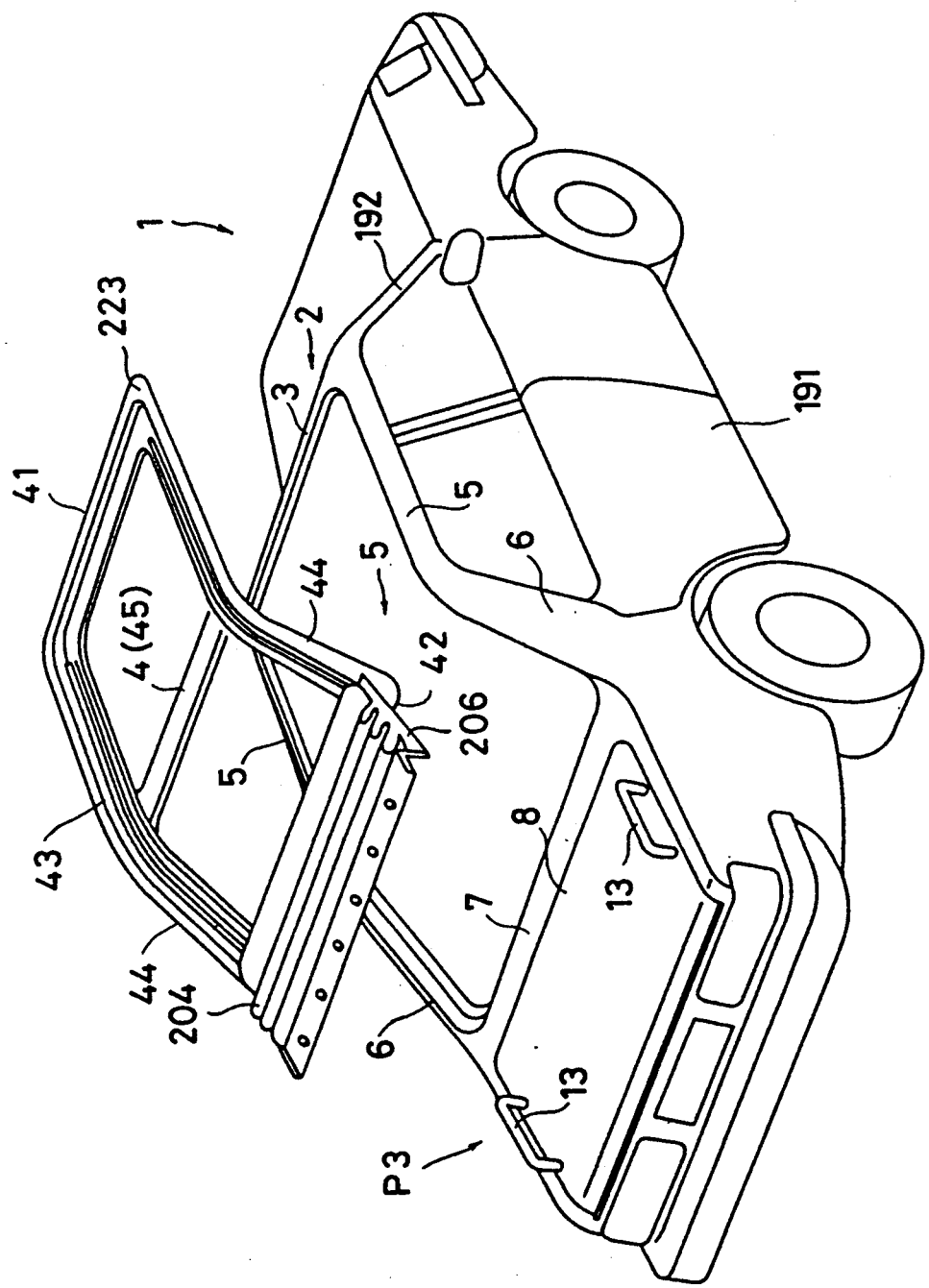

Referring first to FIGS. 2 and 5, a canvas top vehicle 1 is provided on its roof panel 2 with a roof opening 10 in a rectangular form. The roof opening 10 is constructed in such a manner that it is opened or closed with a flexible top 4 as shown in FIGS. 1 and 2.

As shown in FIGS. 2 and 5, the roof panel 2 is connected to a vehicle body 191 (a lower portion of the vehicle body) through at least a pair of left-hand and right-hand front pillars 192, 192, a pair of left-hand and right-hand rear pillars 6, 6. The roof opening 10 has a large opening area which is surrounded by a front header 3, a pair of left-hand and right-hand roof side rails 5, 5, and a rear header 4. To the front header 3 and the left-hand and right-hand front pillars 192, 192 are fixed a front window glass panel 193 (FIG. 2), while a rear window glass panel 9 is fixed to the rear header 4 and the left-hand and right-hand rear pillars 6, 6.

In this example, it is noted that, as shown in FIG. 5, the rear header 4 is substantially constructed by a rear header portion 45 of a base frame 223 as will be described more in detail.

To the canvas top vehicle 1 with the roof opening 10 is mounted the base frame 223 which has usually been assembled in advance with various parts required for the canvas top vehicle 1, such as a flexible top 204 and a board member 206. The mounting of the base frame 223 permits a large reduction in labor otherwise required for processing and assemblying various parts to be mounted to the vehicle body 191 of the canvas top vehicle 1.

Figure 7:
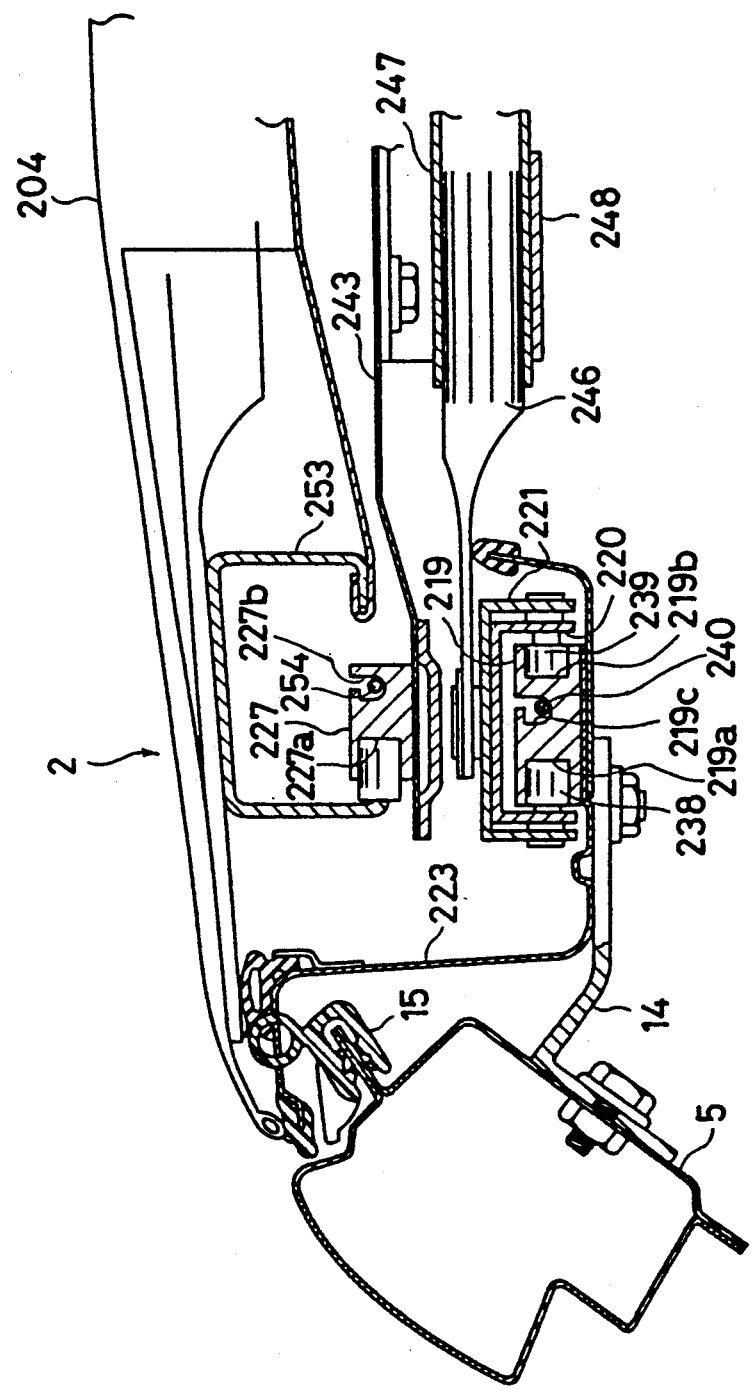

The base frame 223 is mounted on circumferential edge portions of the roof opening 10 and a rearward opening which is to be closed with the rear window glass panel 9. Thus, the base frame 223 comprises a front header portion 41 corresponding to the front header 3, a rear deck portion 42 corresponding to a rear deck 7, left-hand and right-hand side rail portions 43, 43 corresponding to the respective left-hand and right-hand side rails 5, 5, a rear pillar portion 44 corresponding to the rear pillar 6, and a rear header portion 45 constituting the rear header 4. It is thus to be noted that an opening area or space surrounded by the four portions 41, 43, 43, and 45 corresponds to the roof opening 10. As shown in FIG. 7, the mounting of the base frame 223 is effected by bolting it to the vehicle body 191 using a mounting bracket 14, and a gap between the body 191 and the frame 223 is sealed with a sealing material 15.

Figure 41:
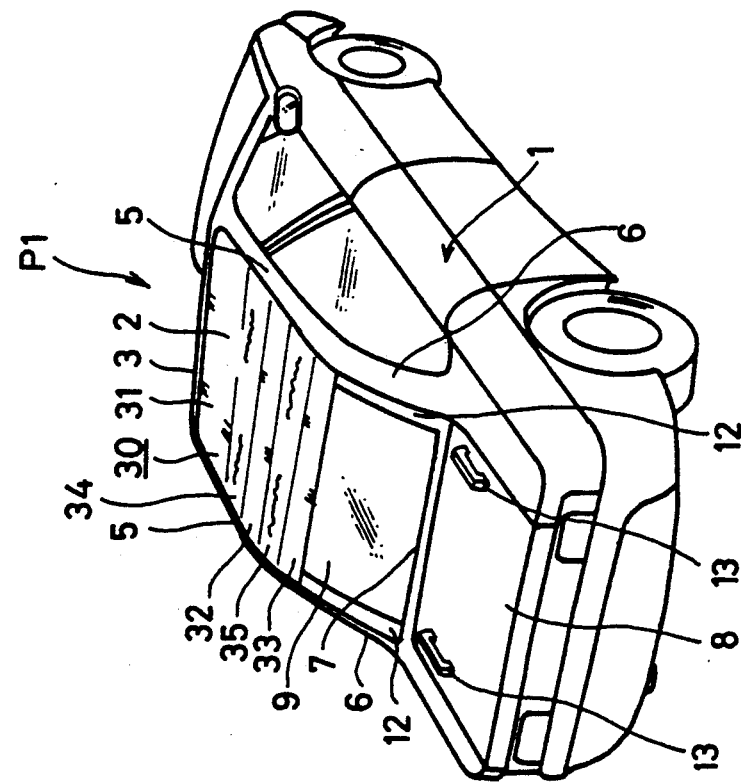

The flexible top 204 to cover the roof opening 10 has a size which is somewhat larger than or substantially as large as an area of the roof opening 10 when unfolded and extended. The flexible top 204 may be extended toward the front of the body to a first posture (corresponding to the posture indicated by the symbol P1 in FIG. 41 for the second example, although it is not indicated in this example) from a second posture P2 and may selectively take one of these postures and a third posture P3. The first posture is a posture in which the flexible top 204 is fully extended to close the roof opening 10. The second posture P2 is a posture in which the flexible top 204 is contracted and folded in the longitudinal direction of the vehicle body toward the rear thereof up to a position in a vicinity of the position at which the rear header 4 is located, thereby opening the roof opening 10. The third posture P3 is a posture in which the flexible top 204 is further transferred from the second posture P2 toward the rear of the body and located at a position, in this embodiment, rearward of and in a vicinity of a lower end portion of the rear window glass panel 9. More specifically, the third posture P3 is located at a position which is substantially as high as and rearward of the lower end portion of the rear window glass panel 9. On a side of the body rearward of the lower end portion of the rear window glass panel 9 is disposed a trunk lid 8 on which a support stand or rest is fixed which is designed such that the flexible top 204 folded in the third posture P3 is placed or rested thereon through a board member 206 as will be described more in detail hereinbelow.

The board member 206 is to support the flexible top 10 in a contracted form, i.e., in a folded form from underneath and is constructed so as to be conveyable or displaceable between the second posture P2 and the third posture P3 while the flexible top 204 is placed on the board member 206.

As shown in FIG. 1, the flexible top 204 may be extended from the second posture P2 to the first posture or contracted from the first posture to the second posture P2 by means of a first actuator 210 mounted on the board member 206, on the one hand, while the flexible top 204 contracted or folded and placed on the board member 206 at the second posture P2 may be displaced or conveyed together with the board member 206 to the third posture P3 or vice versa by means of a second actuator 212 mounted on the side of the body 191 underneath the rear window glass panel 9 through a guide means 211 constituted by a link mechanism and so on, on the other hand. A separate operation of closing or opening the roof opening 10 with the flexible top 204 and transferring it between the second and third postures P2 and P3 can be carried out using different driving sources so that this operation can presents the advantage that an electric motor with optimized electric characteristics can be preferably selected in each case, thereby saving useless output powers. It is to be noted that the operation of closing or opening the roof opening 10 with the flexible top 204 does not require power larger than the operation of conveying the board member 206 with the contracted flexible top 204 placed thereon between the second and third postures P2 and P3 so that the electric motor as the second actuator 212 should have power larger than the electric motor as the first actuator 210.

Figure 4:
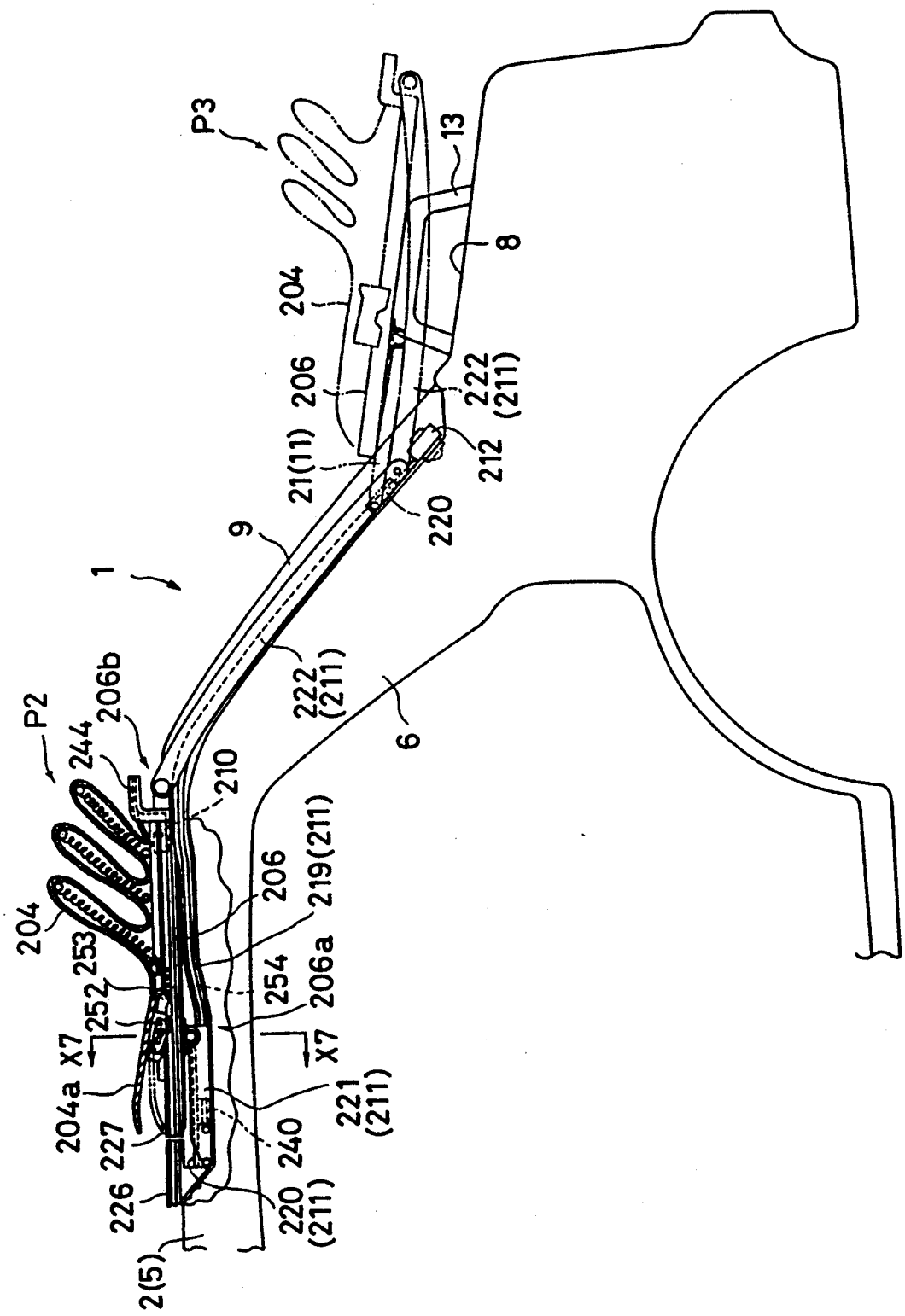

Referring now to FIG. 4, the guide means 211 for conveying or transferring the flexible top 204 in the folded state on the board member 206 between the second posture P2 and the third posture P3 comprises a guide rail 219, a pair of forward links 221, 221, and a pair of rearward links 222, 222. The guide rail 219 is mounted to the roof side rail 5 and disposed along the rear pillar 6. The forward links 221, 221 are to slidably connect a forward portion 206a of the board member 206 to the guide rail 219 through a sliding body 220. The rearward links 222, 222 are to connect a rearward portion 206b of the board member 206 to the guide rail 219. This arrangement permits the flexible top 204 contracted or folded on the board member 206 disposed at the second posture P2, when opening the roof opening 10, to be conveyed or transferred together with the board member 206 to the third posture P3 with ease and stability, thereby providing a wide open feeling on the ceiling of the vehicle.

Figure 3:
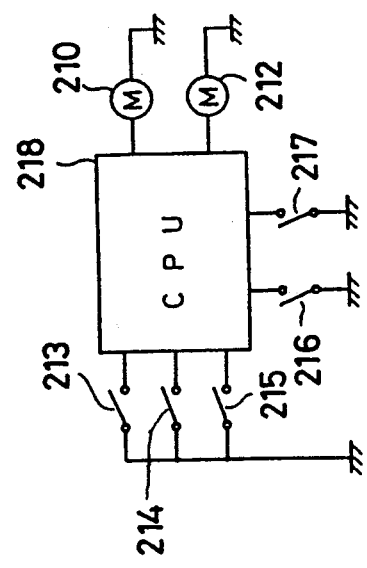

As shown in FIG. 3, instruction signals from an opening switch 213, a closing switch 215, and a hand brake switch 214, each manually operable by the operater, and detection signals from a full-open detecting switch 216 and a half-open detecting switch 217 are generated into a microcomputer (CPU) 218, and electric motors 210 and 212 are turned on or off to open, close or transfer the flexible top 204 in a wasteless and smooth manner, as will be described hereinbelow. The full-open detecting switch 216 and the half-open detecting switch 217 are limit switches mounted to detect a full-open state and a half-open state, respectively, of the flexible top 204 on the roof side rails 5, 5.

Figure 6:
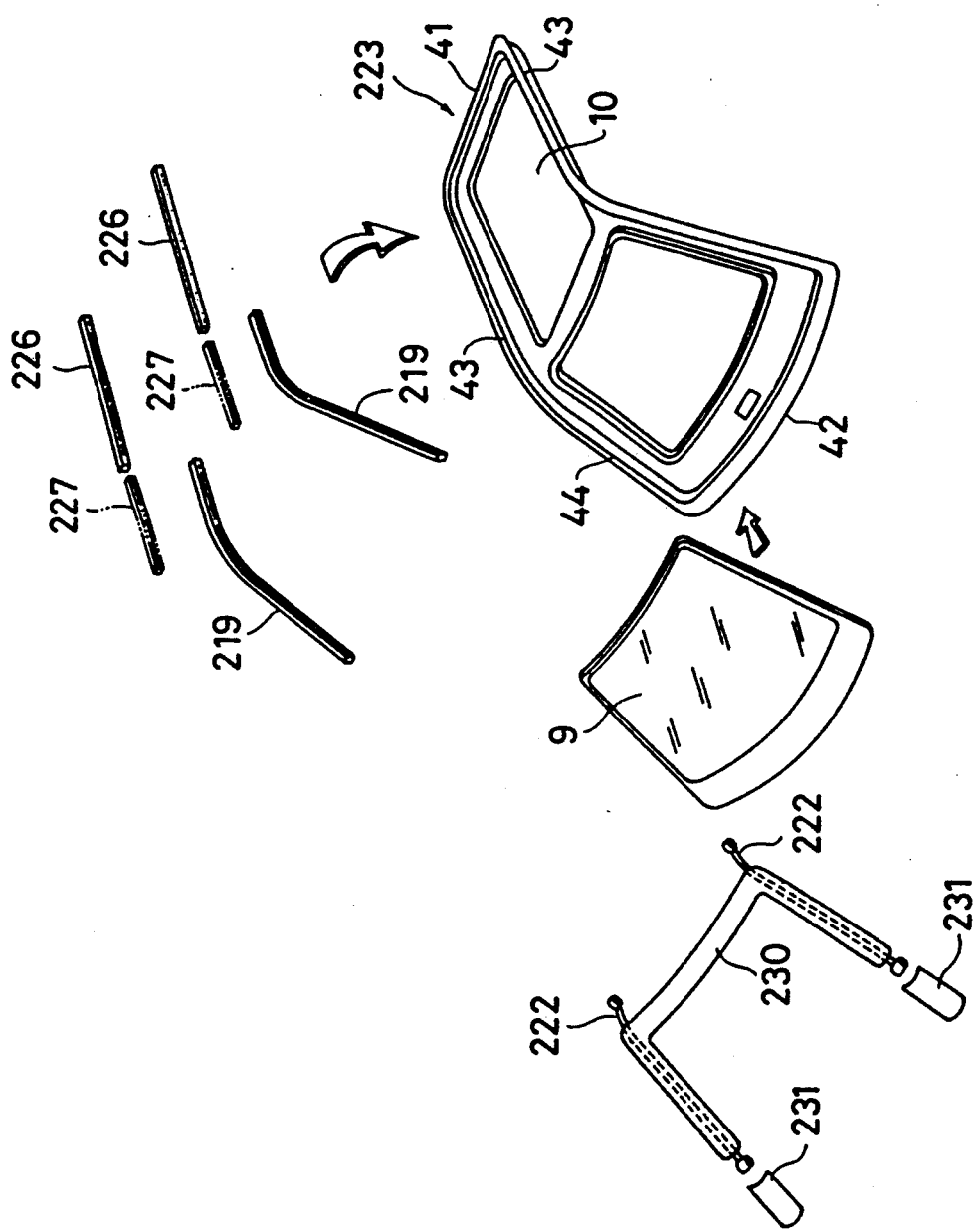
Figure 9:
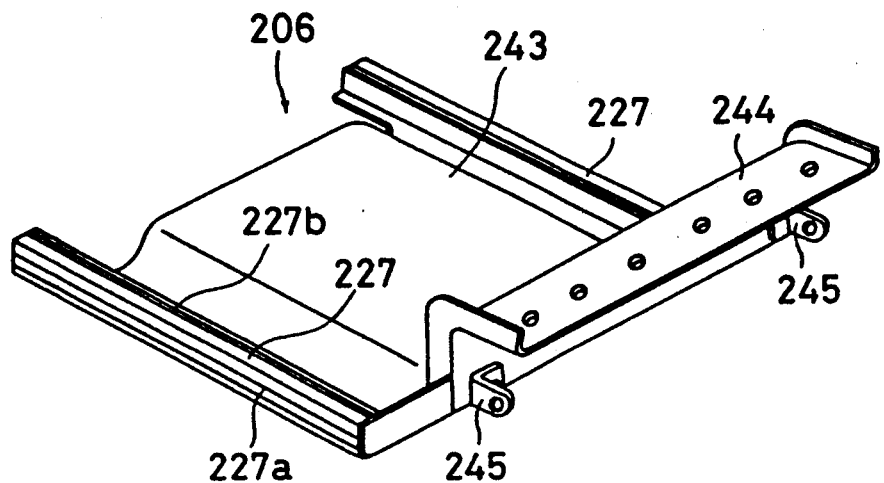
Figure 11:
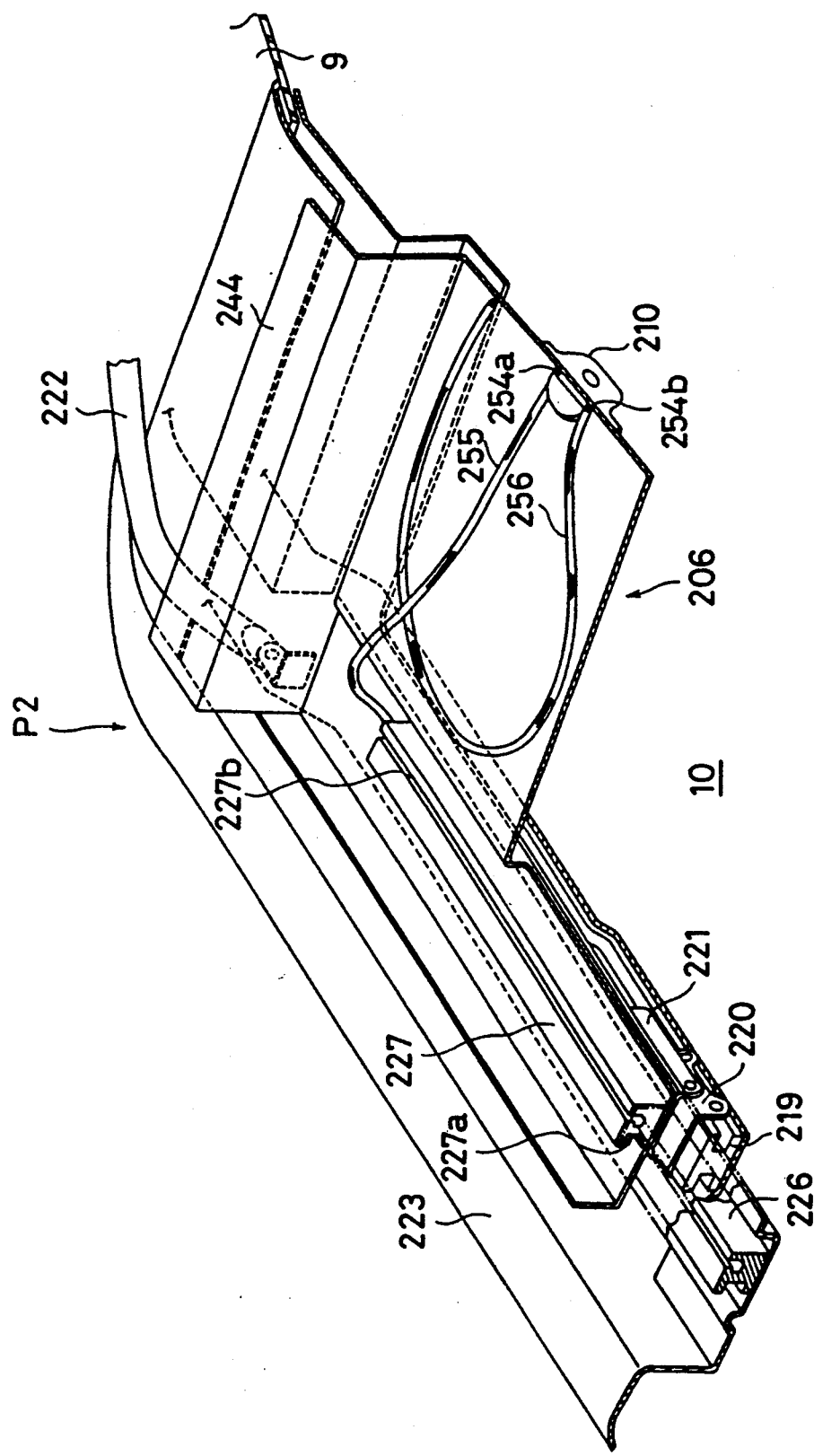

Referring to FIG. 6, the base frame 223 is shown such that curved guide rails 219 are disposed so as to become somewhat broader as they go down from a rear portion of the roof side rail 5 to a lower portion of the rear pillar 6. Forward of the guide rails 219, 219 extend stepwise a pair of guide rails 226, 226, each in a straight form, up to the front end of the base frame 223. A pair of short guide rails 227, 227, each having the same width as each of the guide rails 226, 226, as shown by the chain line in the drawing, are mounted on the board member 206 (FIGS. 9 and 11). When the board member 206 is in the third posture P3, each of the guide rails 226, 226 is composed so as to be connected to each of the short guide rails 227, 227. In the drawing, reference numerals 230 and 231 denote garnish members covering canvas top structuring parts to be mounted on an outer surface of the rear pillar 6 and on side end portions of the rear window glass panel 9.

Figure 8:
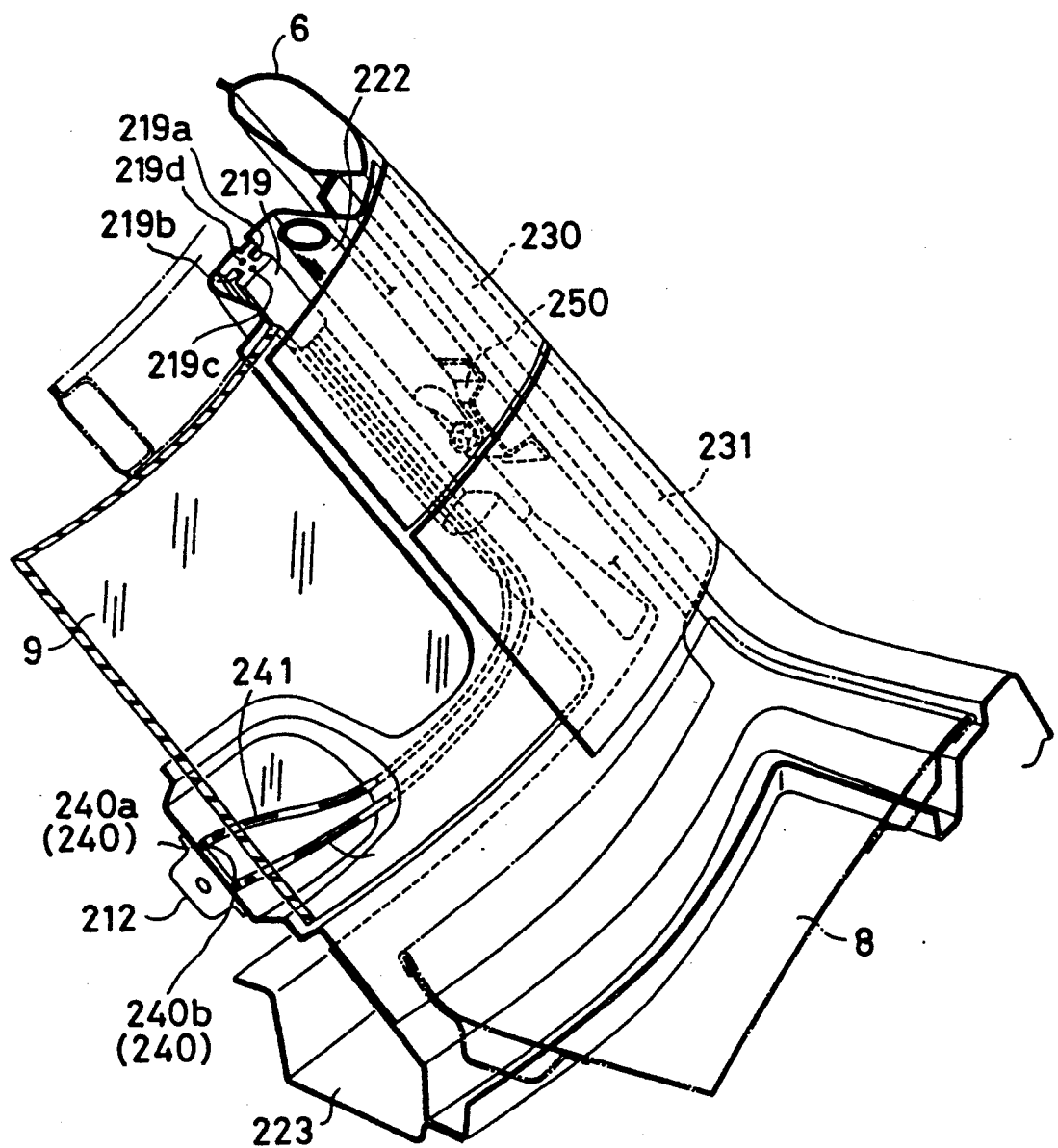

As shown in FIGS. 7, 8, and 11, the guide rails 219, 219 are fixed on the base frame 223. On the both sides of the guide rail 219 are formed roller guiding grooves 219a and 219b for guiding each of rollers 238 and 239, respectively, supported by a sliding body 220. On the middle portion of the base guide rail 219 is formed a driving cable guiding groove 219c for guiding a cable 240 for driving the sliding body 220.

As shown in FIG. 8, the cable 240 is driven and directed in a forward or backward direction by means of normal or reverse rotations of the electric motor 212 mounted underneath the rear window glass panel 9, and the sliding body 220 fixed to a forward end of the cable 240 is operated to be moved from the foremost position as shown in FIG. 4 to the lower portion of the rear window glass panel 9. Although not shown in the drawing, a driving gear fixed to an output shaft of the electric motor 212 is meshed with the cable 240, and a rearward half section of the cable 240 to be wound when the sliding body 220 is moved backwardly is housed or accommodated in an idle cable guiding groove 219d formed at a rearward half section of the guide rail 219 on the side opposite to each other. More specifically, on the right-hand side of the base frame 223 as shown in FIG. 8, the rearward half section of a cable 240a to be meshed with the upper end portion of the driving gear of the electric motor 212 is guided and inserted into the idle cable guiding groove 219d through an idle tube 241, while the forward half section of a cable 240b to be meshed with the lower end portion of the driving gear is guided and inserted into the driving cable guiding groove 219c through a driving tube and its tip is connected to the sliding body 220. Although not shown in the drawing, on the left-hand side of the base frame 223, the forward half section of the cable 240a is inserted through the driving tube into the driving cable guiding groove of the guide rail and connected to the sliding body, while the rearward half section of the cable 240b is inserted into the idle cable guiding groove of the guide rail through the idle tube, in substantially the same manner as on the right-hand side of the base frame 223 yet in a manner opposite to the right-hand side thereof.

Referring now to FIG. 9, the board member 206 for placing the flexible top 204 in a folded state comprises a base plate 242, a pair of the guide rails 227, 227, and a flexible-top mounting portion 244. The base plate 243 is formed such that its both side end portions are lowered, and the guide rails 227, 227 are fixed on the both lowered side end portions of the base plate 243 and serve as operating to open or close the flexible top 204. Each of the guide rails 227, 227 is provided on its outer side with the roller guiding groove 227a and on its upper side with the cable guiding groove 227b (as shown specifically in FIG. 10). The flexible top mounting portion 244 is disposed on the rearward end portion of the board member 206 so as to be raised in a flange-like form and provided with a plurality of screw holes through which the rearward end portion of the flexible top 204 is fixed by means of screws. On a lower portion of the mounting portion 244 are mounted a pair of eye mounting members 245, 245 for mounting the rearward links 222.

Figure 10:
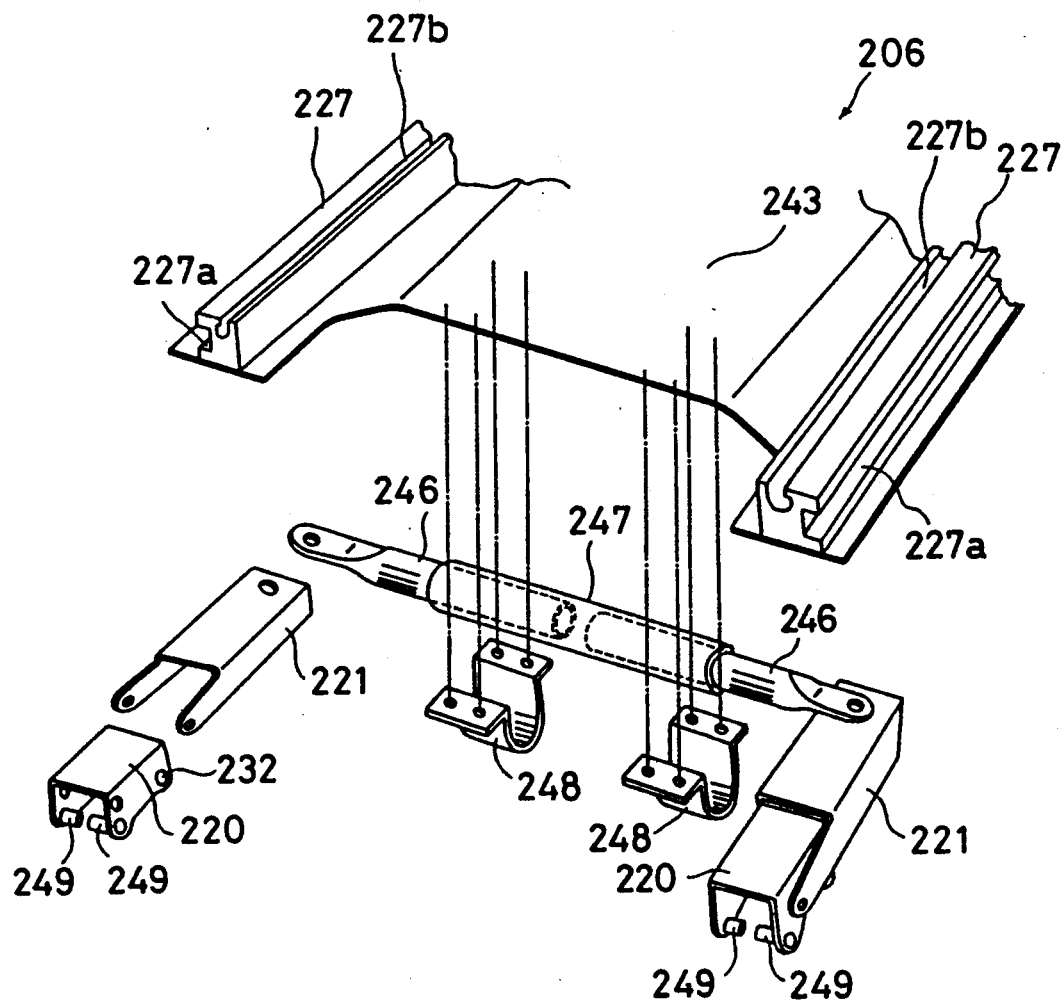

Referring then to FIG. 10, the base plate 243 of the board member 206 is mounted at a forward portion of its reverse side with a pair of mounting members 248, 248, which are bolted and through which a cylindrical body 247 is fixed. Through both sides of the cylindrical body 247 are slidably inserted on its both sides rods 246, 246. To an outer end portion of each of therods 246, 246 is bolted one end of the forward link 221 which, in turn, is pivotably connected at its other endportion in or to the sliding body 220. This arrangement for a transverse movement of the rods 246, 246 enables an effective adjustment of a span of the two sliding bodies 220, thereby accommodating an expansion of the guide rails 219, 219 in the transverse direction of the body. On the both inner side walls on each of its forward and rearward side portions of the sliding body 220 are mounted a pair of supports 249, 249 (FIG. 7) which, in turn, support the rollers 238 and 239 to be guided in the respective roller guiding grooves 219a and 219b of the guide rail 219, thereby enabling the sliding body 220 connected to the cable 240 to be moved along the guide rail 219.

A lower end portion of the rearward link 222, which is connected at its upper end portion to the eye mounting member 245 (FIG. 9) disposed at the rearward portion of the board member 206 and which supports the rearward portion of the board member 206, is pivotably connected with a bolt and a nut to a shaft supporting member 250 disposed at a lower portion of the rear window glass panel 9 so as to be pivotable in a rearward direction, as shown in FIG. 8.

As shown in FIG. 4, the flexible top 204 comprises a leather top body at its roof portion, which is contracted or folded, and a sealing leather body at its inner portion, which is composed of a frame member, and it is fixed at its rearward end portion with screws to the mounting portion 244 of the board member 206. A forward end portion of the flexible top 204 is made of a hard board 204a and constructed so as to be lifted up in the manner as shown in the drawing when the roof opening 10 is opened, thereby reducing a sliding resistance. The hard board 204a is provided with a cam 252, and a guide shoe 253 associated with the cam 252 is guided to be transferable from the guide rail 226 disposed on the roof side rail 5 to the guide rail 227 disposed on the board member 206 or vice versa. The guide shoe 253 is also drivable in forward and rearward directions by means of the motor 210 disposed on the board member 206 through the cable 254. When the roof opening 10 is opened, the guide shoe 253 pulls the cam 252 rearwardly and the flexible top 204 is pulled backwardly, too, while the forward end portion thereof is lifted up in the manner as shown in FIG. 4. When the roof opening 10 is closed, the flexible top 204 advances forwardly while its forward end portion is lifted down in the manner as shown by the broken line in the drawing.

More specifically, the electric motor 210 is mounted in the rearward and middle portion on the reverse side of the board member 206 as shown in FIG. 11 indicating the right-hand portion of the board member 206 disposed in the second posture P2. With a driving gear (not shown) fixed to the output shaft of the motor 210 are meshed the right-hand cable 254a and the left-hand cable 254b, the former being inserted through the driving tube 255 in the cable guiding groove 227b disposed on the guide rail 227 and an idle portion of the latter being inserted in the idle tube 256. A top end of the cable 254a is fixed to the guide shoe 253 which is constructed so as to move rearwardly by means of a normal rotation of the electric motor 210 and to move forwardly by means of a reverse rotation thereof. It is further noted that, although not shown, the full-open detecting switch 216 (FIG. 3) is mounted on the board member 206 and generates an ON signal when the guide shoe 253 is caused to be rearwardly displaced up to a given position on the board member 206 and when the board member 206 is displaced in the second posture P2. At an intermediate position of the roof opening 10 in the base frame 223 mounted the half-open detecting switch 217 (FIG. 3) which, in turn, generates an ON signal as the guide shoe 253 reaches the position when the roof opening 10 is opened.

Referring further to FIGS. 4 and 11, when the board member 206 is disposed in the second posture P2 as shown in the drawing, namely, when the sliding body 220 is located at the forward end position of the guide rail 219 and the forward link 221 is disposed side by side along the guide rail 219, the guide rail 227 is connected to the guide rail 226 fixed on the side of the body 191 and the guide shoe 253 is transferable between the guide rails 226 and 227.

Operation of the flexible top 204 will be described more in detail with reference to FIG. 12 as well as FIGS. 13(a) and (b).

Figure 12:
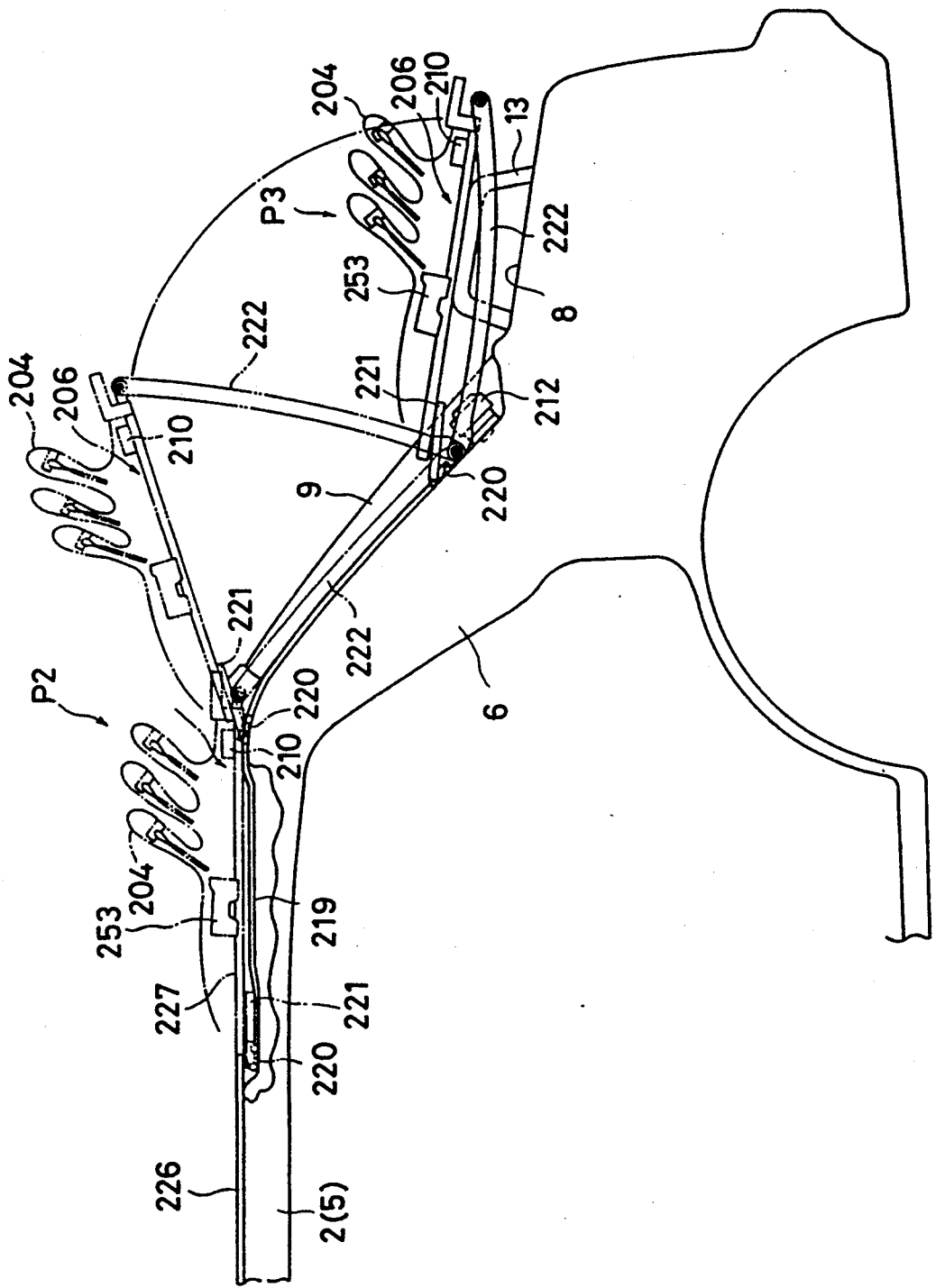
Figure 13A:
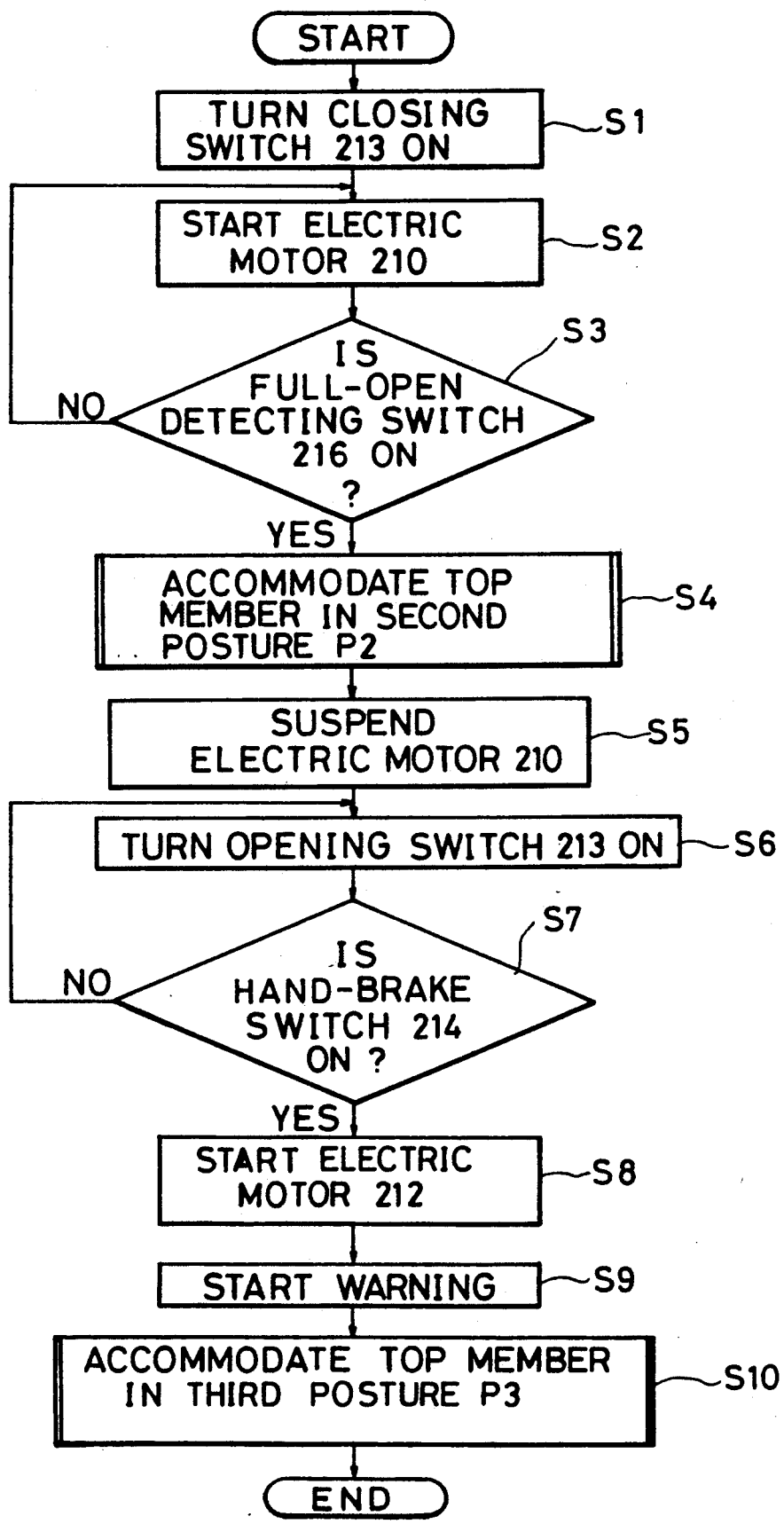

First at step S1, an opening switch 213 is turned on and then at step S2, the electric motor 210 starts and the guide shoe 253 disposed at the forward end position of the roof side rail 5 is moved rearwardly and transfers the guide rails 226 to 227 while contracting or folding the flexible top 204 and placing it on the board member 206 disposed in the second posture P2, as shown in the chain line in FIG. 12. This posture is detected by means of the full-open detecting switch 216 and the switch 216 generates a signal to suspend the electric motor 210 at step S5.

In order to provide a broader open feeling, the board member 206 is transferred and accommodated to the third posture P3 while the flexible top 204 is placed thereon in a folded state. At this end, the vehicle is once suspended and the opening switch 213 is turned on again at step S6. At this time, when a hand brake is pulled and a hand brake switch 214 is on at step S7, then the electric motor 212 is started up at step S8 to start transferring the board member 206 toward the rear of the body while a warning is being given at step S9. In other words, as the motor 212 is started up, the sliding body 220 moves in a rearward direction and rearwardly pushes the forward link 221 which, in turn, follows downwardly from the rearward end of the roof side rail 5 along the guide rail 219 mounted on the both sides of the rear window 9. As the forward link 221 is pushed by the sliding body 220 rearwardly and moves downwardly along the guide rail 219, the rearward link 222 is pivoted about its lower end in the rearward direction as shown by teh chain line in the drawing and then the board member 206 on which the flexible top 204 is placed in a folded state is disposed and accommodated in the third posture P3 on the support base 13 mounted on the trunk lid 8 at step S8, as shown by the solid line in the drawing. Accommodating the board member 206 in the third posture P3 can provide a broader open feeling because the roof opening is full open without intervention from the flexible top 204 when contracted and placed in a folded state.

Figure 13B:
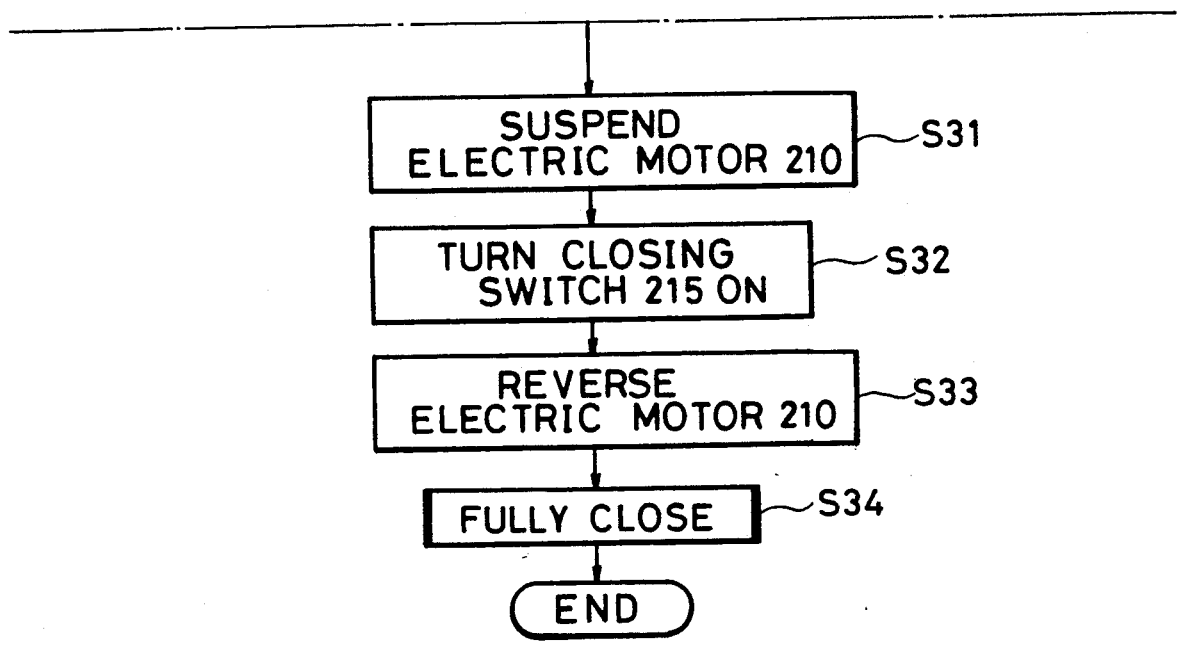

The flexible top 204 can be closed by first turning a closing switch 215 on at step S21 as shown in FIG. 13(b). If the hand brake switch 214 is on in this case at step S22, the electric motor 212 starts rotating in a reverse direction at step S23 while a warning is given at S24. When the full-open switch 216 detects the fact that the board member 206 is placed in the second posture P2 (steps S25 and S26), the motor 212 suspends at step S27 and at the same time the warning suspends at step S28. Thereafter, at step S29, the motor 210 starts reversing and, at step S30, the half-open detecting switch 217 detects a half-open state of the flexible top 204 before the roof opening 10 is fully closed. Then at step S31, once the motor 210 is suspended, and the closing switch 215 is turned on again at step S32, thereby re-starting a reverse rotation of the electric motor 210 and fully closing the roof opening 10 with the flexible top 204 at step S34.

As have been described hereinabove, the flexible top apparatus according to the present invention permits a smooth and wasteless operation of opening or closing the roof opening 10 with the flexible top 204 and of transferring the board member 206 between the second posture P2 and the third posture P3 using different electric motors 210.

SECOND EXAMPLE

FIGS. 14 to 45 are directed to the second example of the flexible top apparatus according to the present invention, in which the same elements are provided with the same reference numerals and symbols and description on those elements will be omitted for brevity of explanation. That is, reference numeral 1 stands for a canvas top vehicle, 2 for a roof panel, 3 for a front header, 4 for a rear header, 5 for a roof side rail, 6 for a rear pillar, 7 for a rear deck, 8 for a trunk lid, 9 for a rear window, 10 for a roof opening, 191 for a vehicle body, 192 for a front pillar, and 193 for a front window glass panel. In this embodiment, a board member, a flexible top, and a base frame are provided with reference numeral 20, 30, and 40, however, these elements are substantially the same as the board member 20b, the flexible top 204, and the base frame 223 in the first example, respectively. In this second example, the rear header 4 is disposed on the side of the vehicle body 191. It is further to be noted that, in this second example, too, the first posture of the flexible top is referred to as P1, the second posture as P2, and the third posture as P3.

The base frame 40 is integrally constituted by a front header section 41, a rear deck section 42, a pair of side rail sections 43, 43, a pair of rear pillar sections 44, 44, and a rear header section 45. It is further to be noted that the base frame 40 is provided with a large opening space, or opening 48, which is surrounded by the front header section 41, the side rail sections 43, 43, and the rear header section 45. The base frame 40 is then fixed to a circumferencial edge portion of the roof opening 10 of the roof panel.

Among sealing portions between the base frame 40 and the vehicle body 191, joint flange portions 3a, 5a, 6a, and 7a (FIGS. 25 to 35) on the side of the roof opening 10, which are formed by an outer panel and an inner panel constituting closed sections for the front header 3, the roof side rail 5, the rear pillar 6, and the rear deck 7, are utilized each as a sealing frange surface for a sealing material 15. For instance, as shown in FIGS. 29 and 36 to 38, if the roof side rail 5 is joined to an end portion of the rear header 4 at a joint portion to the same height level, the joint frange portion 5a does not become flat at its joint portion and its sealing flange surface becomes so discontinuous that the sealing material 15 cannot be provided in a continuous manner, thereby impairing a sealability. Furthermore, if the base frame 40 would be mounted on an upper side of the rear header 4, the base frame 40 projects upwardly from the roof side rail 5, thereby impairing aerodynamic characteristics and an appearance. In this embodiment, as shown in FIGS. 29 and 36 to 38, each of the end portions of the rear header 4 is joined on the side lower than the joint flange portion 5a, thereby making an upper side surface of the base frame 40 flat in a state in which the base frame 40 is mounted—in other words, making an upper side surface of the side rail portion 43 and an upper side surface of the roof side rail 5. This arrangement ensures a sealability between the roof side rail 5 and the base frame 40 and aerodynamic characteristics and a good appearance of the vehicle 1.

Board Member

Figure 22:
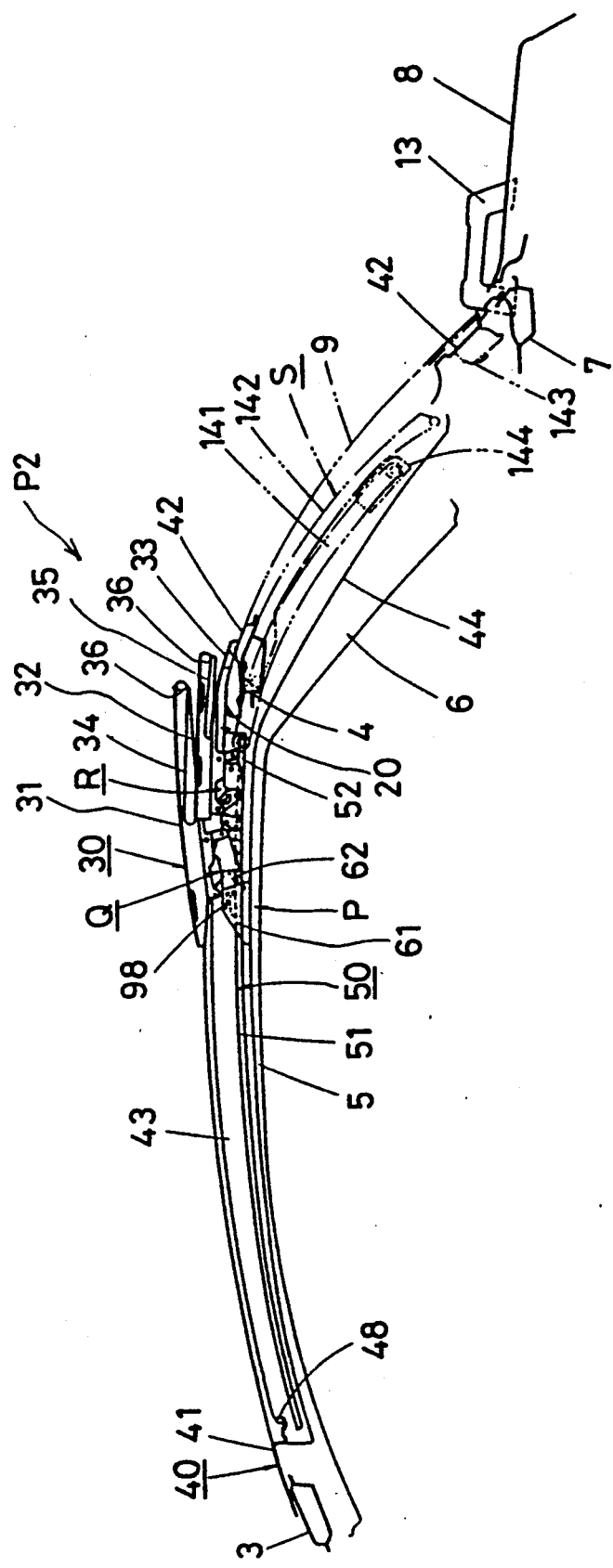
Figure 23:
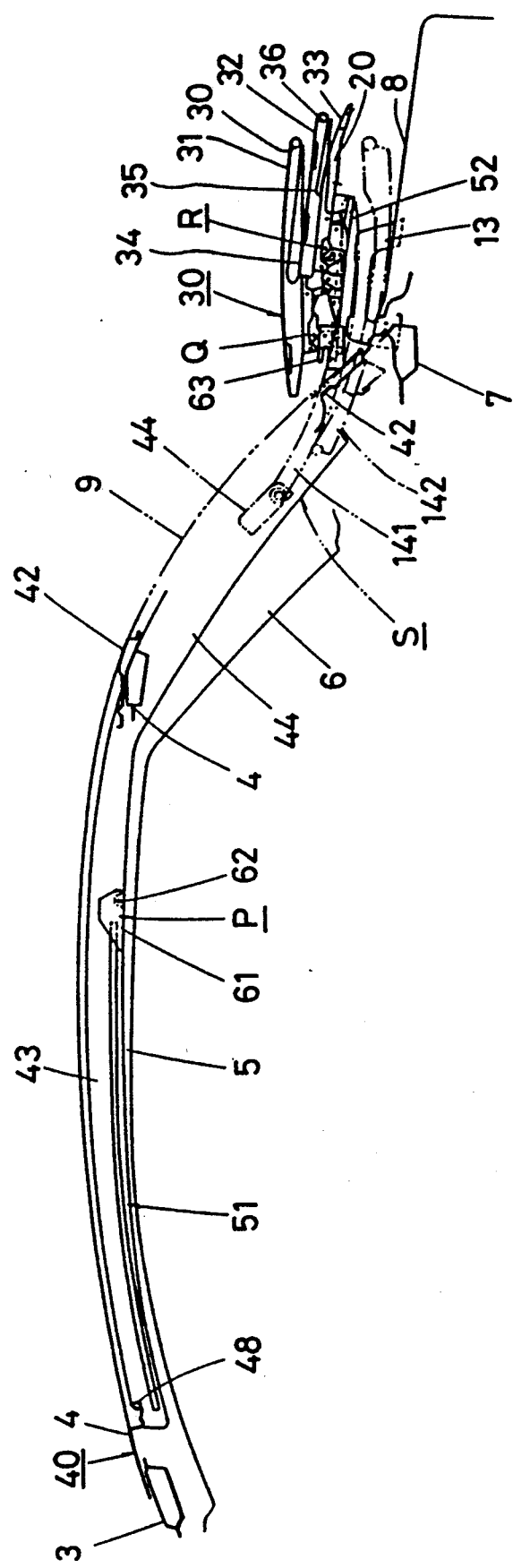

Referring to FIGS. 21 to 23, the board member 20 is shown to be disposed so as to be transferable or conveyable between a rearward end portion of an opening portion 48 of the base frame 40 and the trunk lid 8 of the vehicle body 1 in such a state that the flexible top 30 is placed in a folded shape on the board member 20.

Figure 14:
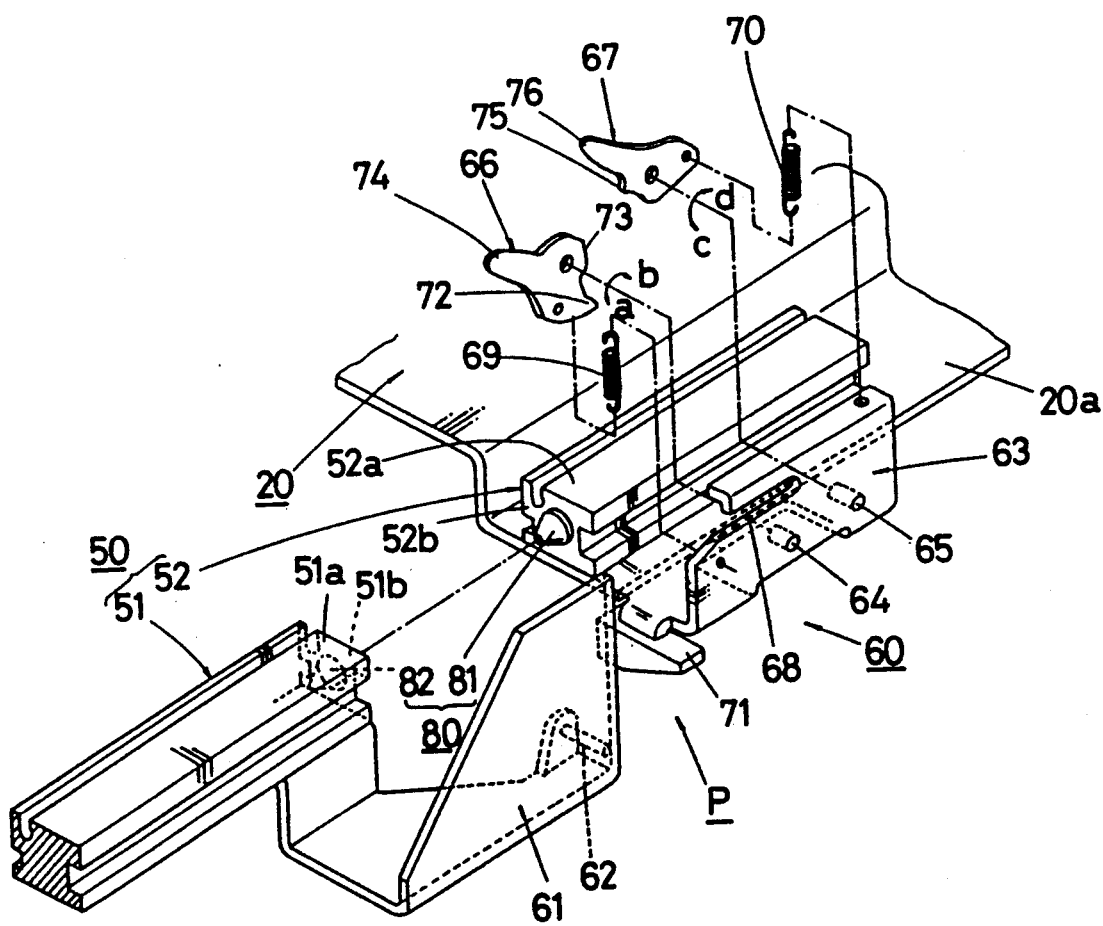
Figure 45:
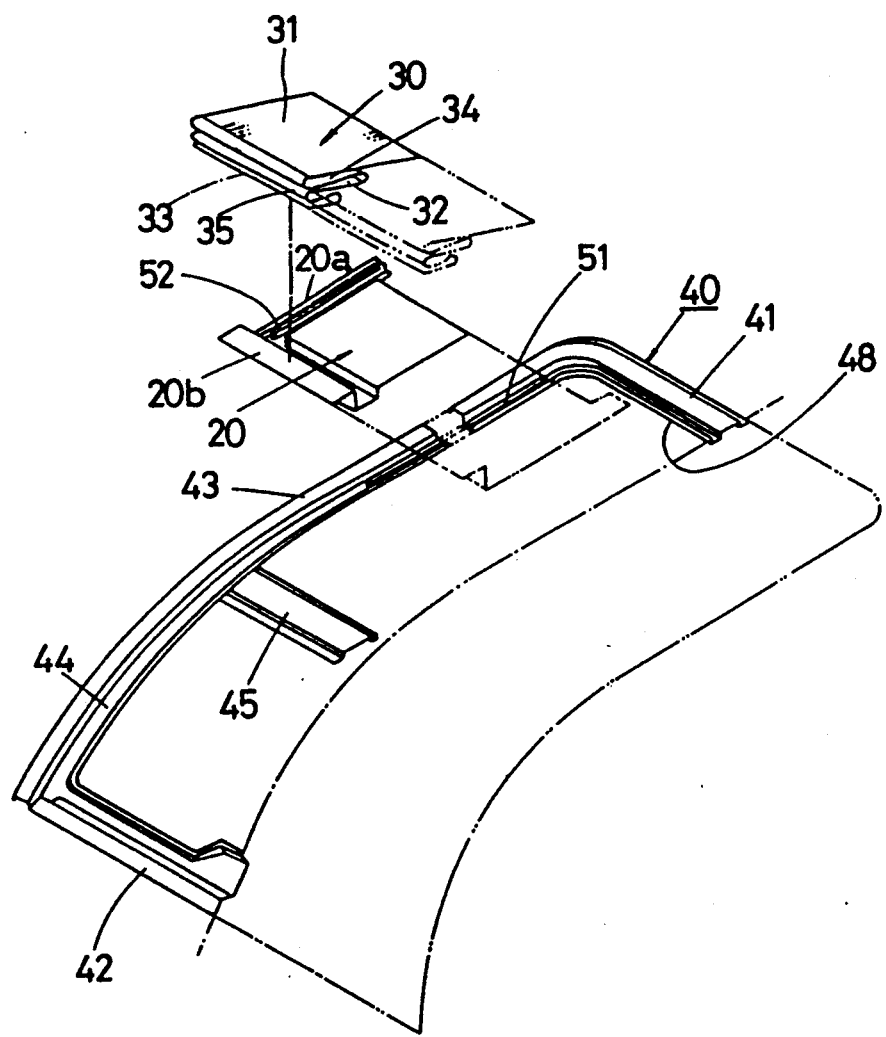

As shown specifically in FIG. 45, the board member 20 is an approximately flat plate body, and a second guide rail 52 is mounted to each side portion 20a of the board member 20, the second guide rail 52 having the same shape in cross section as a first guide rail 51 mounted to a side guide rail portion 43 (as shown in FIGS. 14 and 21, for example). The second guide rails 52, 52 are disposed in substantially the same distance and interval as the first guide rails 51, 51.

Referring now to FIGS. 21-24 and 30, the board member 20 is fixedly mounted at its rearward end portion 20b with a third panel 33 of the flexible top 30 as will be described hereinbelow and transferred pivotably from a rearward end portion of the opening 48 (i.e., second posture P2) and the trunk lid 8 (i.e., third posture P3) by means of a pivoting mechanism S mounted on a pillar portion 44 of the base frame 40 (FIGS. 24, 29, and 33 to 35).

Figure 24:
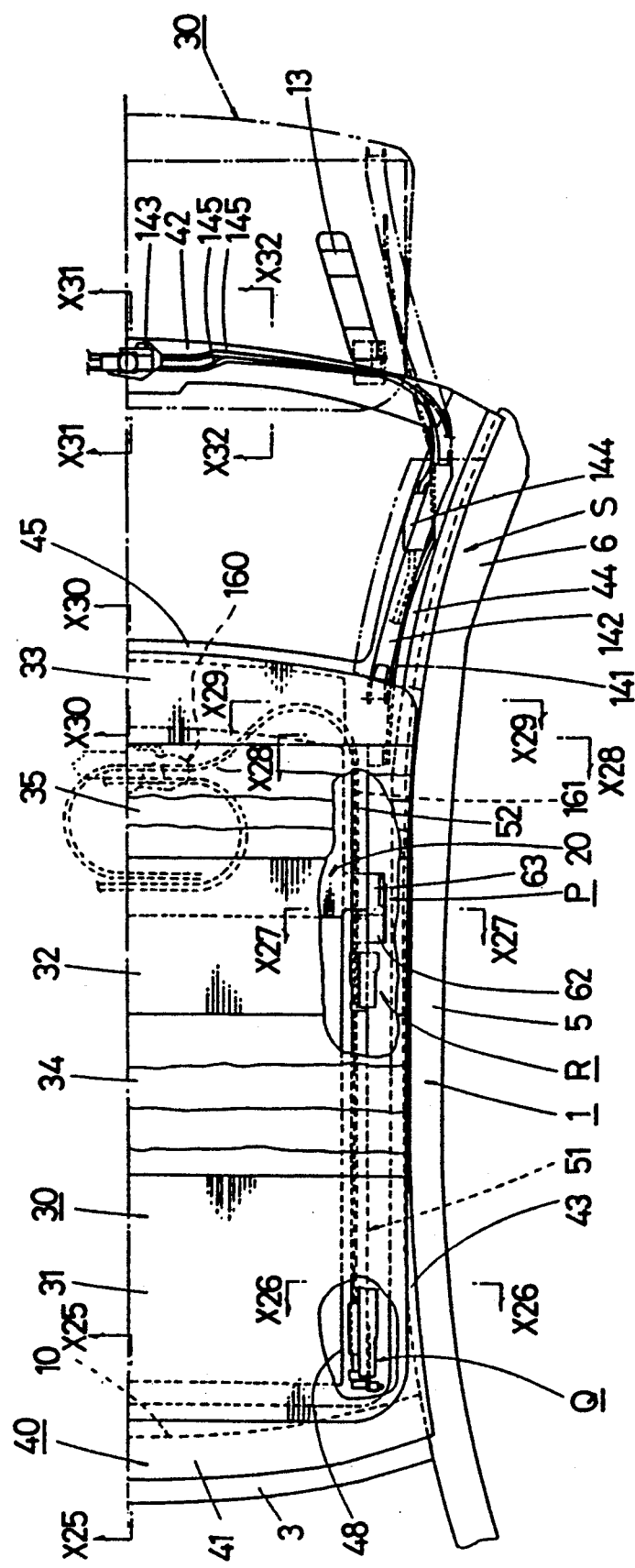
Figure 25:
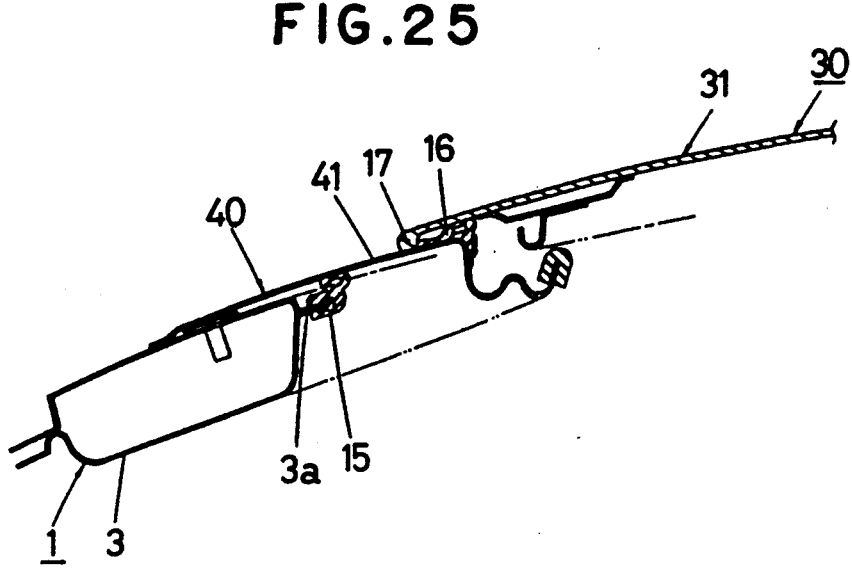
Figure 26:
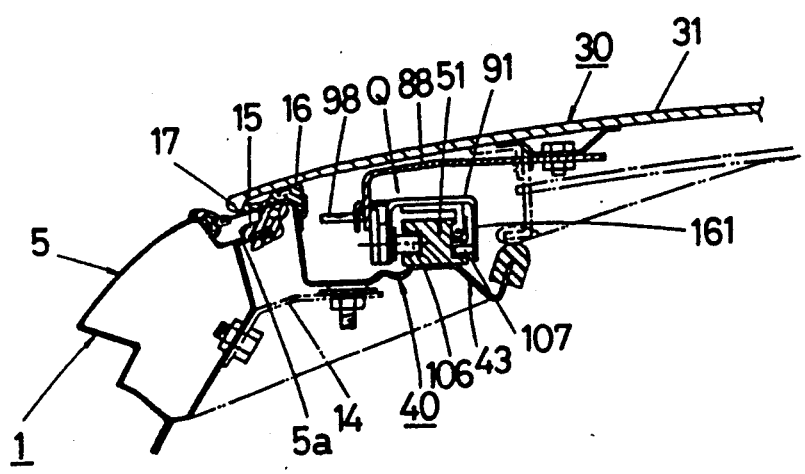
Figure 27:
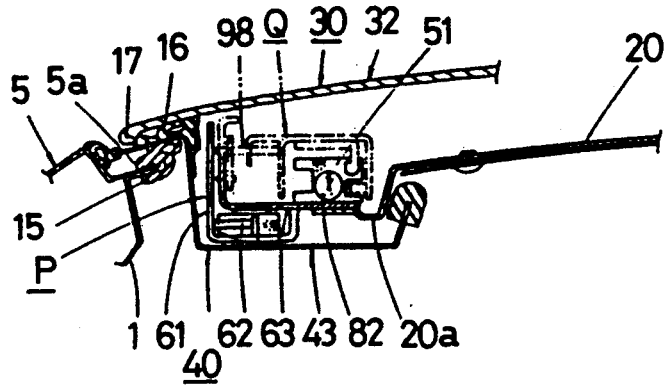
Figure 28:
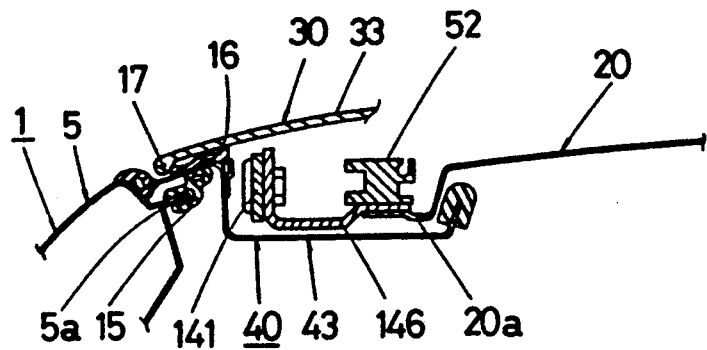
Figure 29:
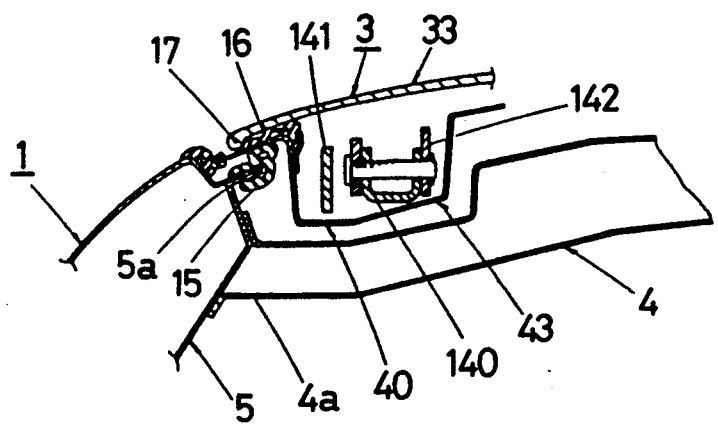
Figure 39:
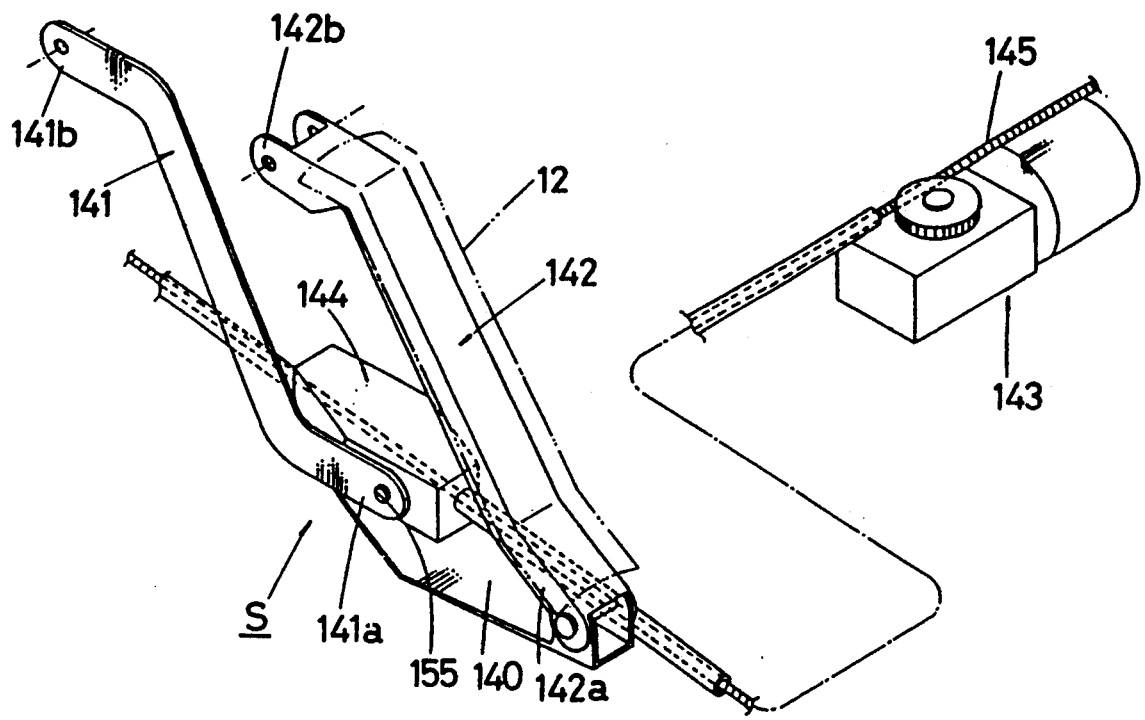

As shown specifically in FIGS. 24 and 39, the pivoting mechanism S comprises a pair of forward and rearward links, namely, a forward link being a main link 141 and a rearward link being a subordinate link 142. The main link 141 is fixed at its base end portion 141a to the output shaft 155 of a drive gear unit 144 as will be described hereinbelow and its top end portion 141b is pivotably mounted to the board member 20. The subordinate link 142 is pivotably mounted at its base end portion 142a to a base 140 and at its top end portion 142b to the board member 20.

Figure 40:
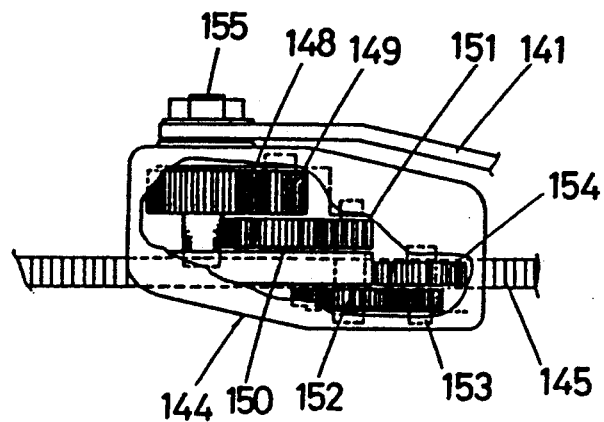
Figure 42:
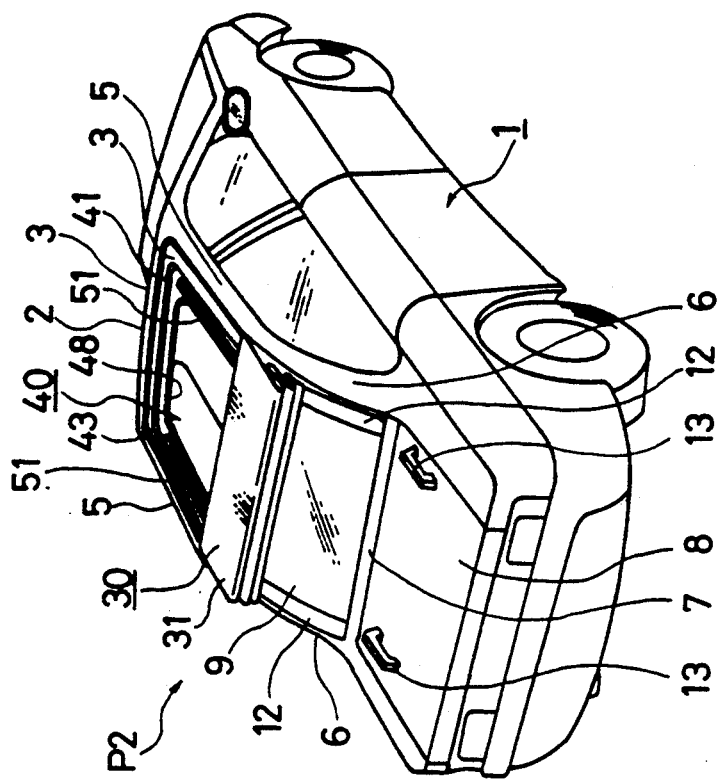

The drive gear unit 144 comprises six decelerating gears 148 to 153 and a driving gear 154, as shown in FIG. 40, and is arranged so as to transmit to the main link 141 a rotational force of the output shaft 155 converted from a displacement force of a cable 145 drived by a motor unit 143 (FIG. 39) disposed on a rear deck section of the base frame 40 (FIGS. 21 to 24 and 31).

Figure 33:
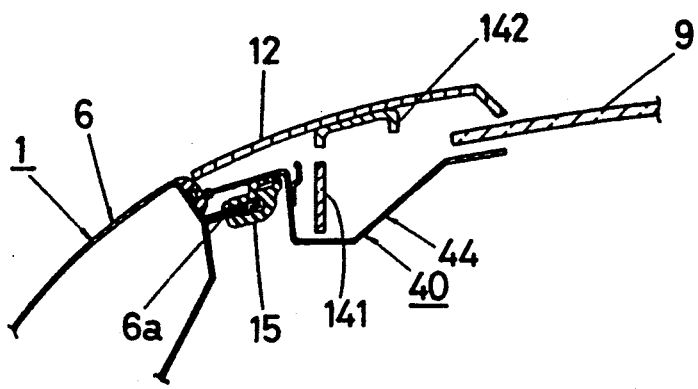
Figure 34:
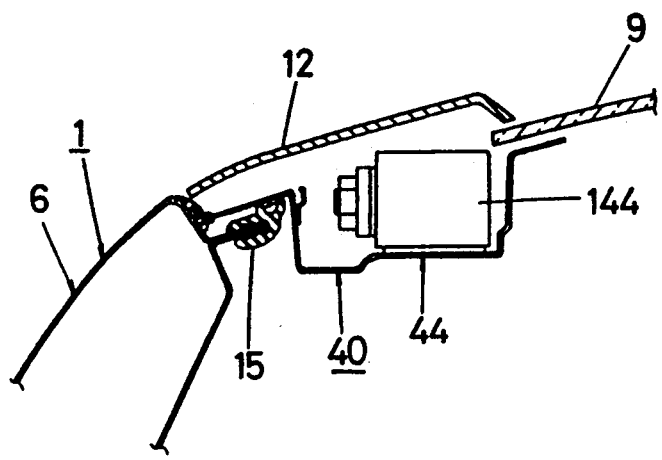
Figure 35:
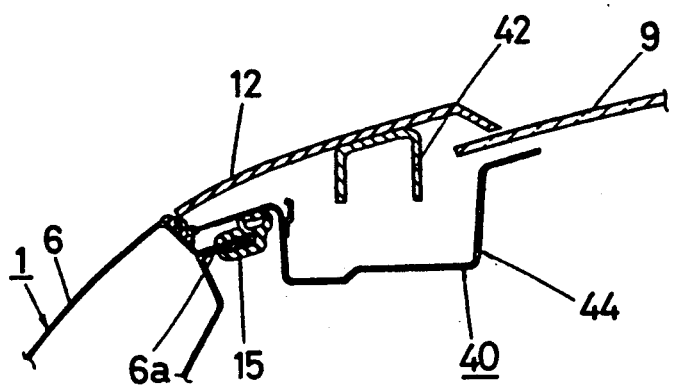
Figure 36:
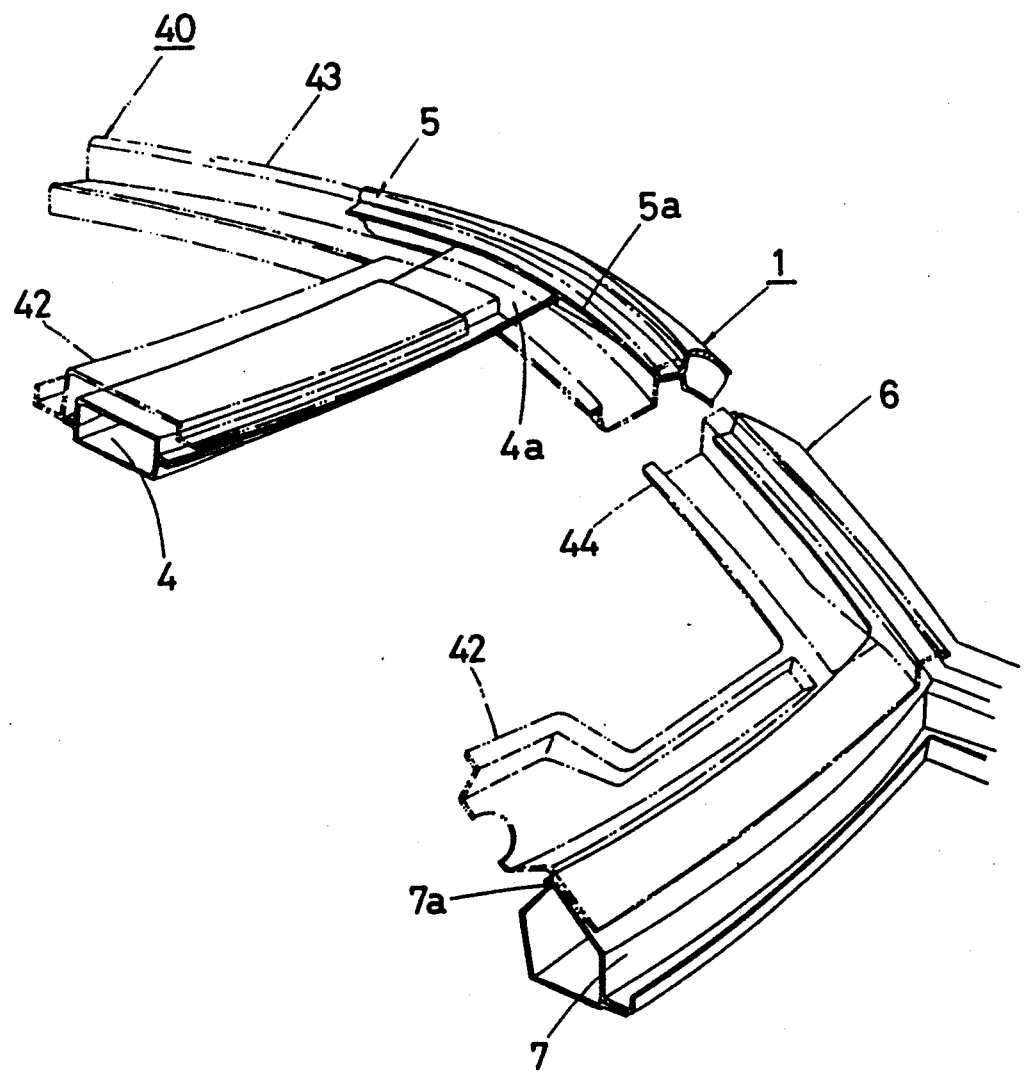

Operation of pushing or pulling the cable 145 by means of the motor unit 143 enables a pivotal movement of the main link 141 in a rearward or forward direction of the vehicle body, thereby transferring the board member 20 between the second posture P2 located at the rearward end portion of the opening 10 (positions as indicated in FIGS. 21, 22 and 24) and the third posture P3 located at the position of the trunk lid 8 (positions as indicated in FIG. 23). In the third posture P3, the board member 20 is placed and fixed on the support base 13 mounted on the trunk lid 8 as shown in FIG. 23. In FIGS. 33 and 35, reference numeral 12 denotes a link cover for protecting the pivoting mechanism S from being disposed to the outside.

The board member 20 in the second posture P2 is arranged such that the second guide rail 52 mounted on its upper surface is disposed so as to be coaxially continuous to the first guide rail 51 mounted on the side rail portion 43 of the base frame 40, thereby constituting a guide rail 50 astride the forward and rearward end portions of the opening 48. In this case, a position regulating device P is provided at a position around the aligning or matching portions of the first and second guide rails 51 and 52, respectively.

Position Regulating Device

In order to coaxially align an end surface of the first guide rail 51 on its rear end side with an end surface of the second guide rail 52 on its front end side and fit together with each other, the position regulating device P is disposed at a position at which the first and second guide rails 51 and 52 are aligned or matched with each other. The position regulating device P comprises a lock mechanism 60 and an engagement mechanism 80.

Lock Mechanism

The lock mechanism 60 is to determine a relative position mainly in an axial direction and in a vertical direction between the first guide rail 51 and the second guide rail 52 when the board member 20 is fixed to the second posture P2 from a posture in which the board member 20 is transferred and pivotted.

Figure 15:
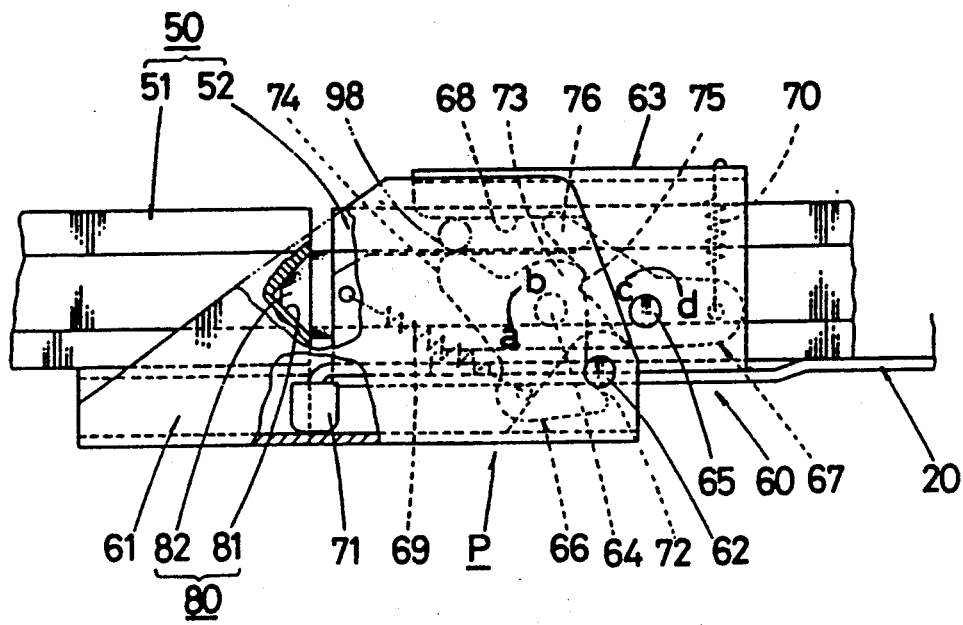
Figure 16:
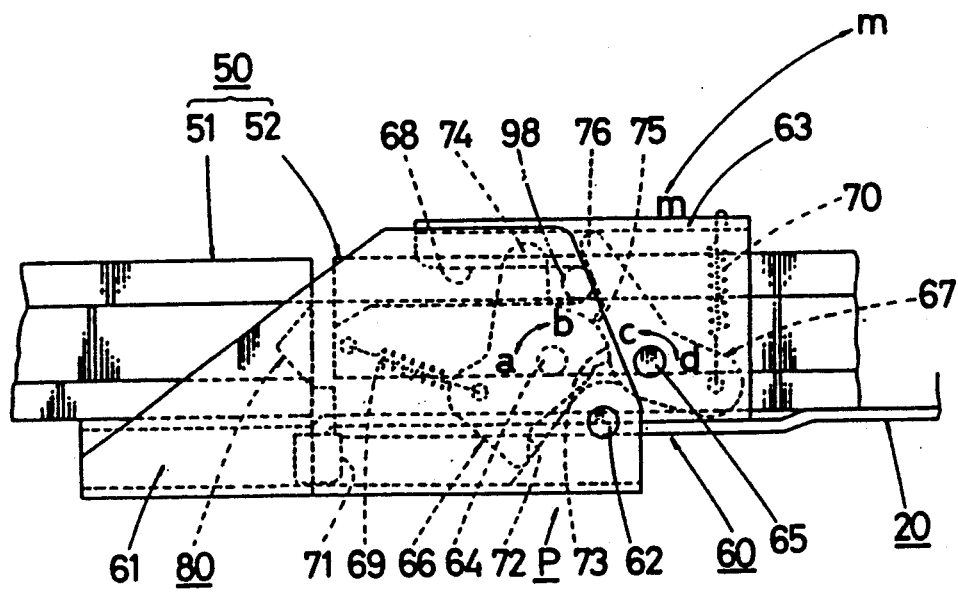

As shown in FIG. 14, the first guide rail 51 is provided with a striker 62 while the second guide rail 52 is provided with a first lever 66 and a second lever 67. The striker 62 is mounted to a striker bracket 61 mounted at a rearward end portion 51a of the first guide rail 51. The striker bracket 61 is disposed so as to project from the rearward end portion 51a of the first guide rail 51 toward the rear and the striker 62 is disposed at a rearward end portion of the striker bracket 61 as shown in FIG. 14. Thus, in a state in which the first guide rail 51 is connected to the second guide rail 52, as shown in FIGS. 15 and 16, the striker 62 projects largely toward the second guide rail 52 and is disposed at a position as low as a lower surface of the second guide rail 52.

The first and second levers 66 and 67 are disposed on the second guide rail 52 in a spaced relationship in an axial direction of the guide rail so as to be pivotably supported by a lock bracket 63 mounted on a forward end portion of the second guide rail 52. As shown specifically in FIG. 14, the first lever 66 comprises a first convex portion 72, a second convex portion 73, and a third convex portion 74, while the second lever 67 comprises a first convex portion 75 and a second convex lever 76. As shown in FIGS. 15 and 16, the first convex portion 72 of the first lever 66 is engageable with the striker 62, the second convex portion 73 thereof is engageable with the first convex portion 75 of the second lever 67 so as to regulate a pivotal movement in the direction in which the first convex portion 72 is disengaged from the striker 62, as shown by the arrow b in the drawings, and the third convex portion 74 of the first lever 66 is disposed so as to be engageable with an engaging pin 98 (FIG. 17) mounted on a forward transfer device Q, as will be described hereinbelow, thereby pivotting the first lever 66 toward the direction as indicated by the arrow a in the drawings, by means of a spring 69 which is always urged toward the direction as indicated by the arrow b in the drawings. For the second lever 67, its first convex portion 75 is engageable with the first convex portion 72 of the first lever 66 and its second convex portion 76 is engageable with the engaging pin 98 (FIG. 17) so as to pivot the second lever 67 in the direction indicated by the arrow d in the drawings, by means of a spring 69 which is always urged toward the direction as indicated by the arrow c therein. The third convex portion 74 of the first lever 66 constitutes a lock piece. The lock bracket 63 is provided with a guide groove 68 which is engageable with the engaging pin 98. The lock bracket 63 is disposed so as to be inserted into the inside of the striker bracket 61. The first lever 66 is disposed so as to allow a top end portion of its third convex portion 74 to be located at a position as substantially low as a lower surface of the guide groove 68 in a posture in which the first convex portion 72 is engaged with the striker 62 as shown in FIG. 15—this posture of the first lever 66 will be referred to as an "engaged posture", on the one hand, and so as to allow the third convex portion 74 to project upwardly from an upper surface of the guide groove 68 in such a posture that the first convex portion 72 is disengaged from the striker 62 by means of a pivotal movement in the direction indicated by the arrow b in FIG. 16—this posture of the first lever 66 will be referred to as a "disengaged posture", on the other hand. The second lever 67 is disposed such that its second convex portion 76 projects toward the inside of the guide groove 68 in such a state that the second convex portion 73 of the first lever 66 pivoted by the spring 70 in the direction as indicated by the arrow c and located in the engaged posture is engaged with its first convex portion 75, as shown in FIG. 15—this position of the second lever 67 will be referred to as an "engaged posture", on the one hand, and such that its first convex portion 75 is disengaged from the second convex portion 73 of the first lever 66 in such a state that the its second convex portion 76 is located at an end portion of the guide groove 68 as shown in FIG. 16—this position of the second lever 67 is referred to as a "disengaged posture".

Figure 17:
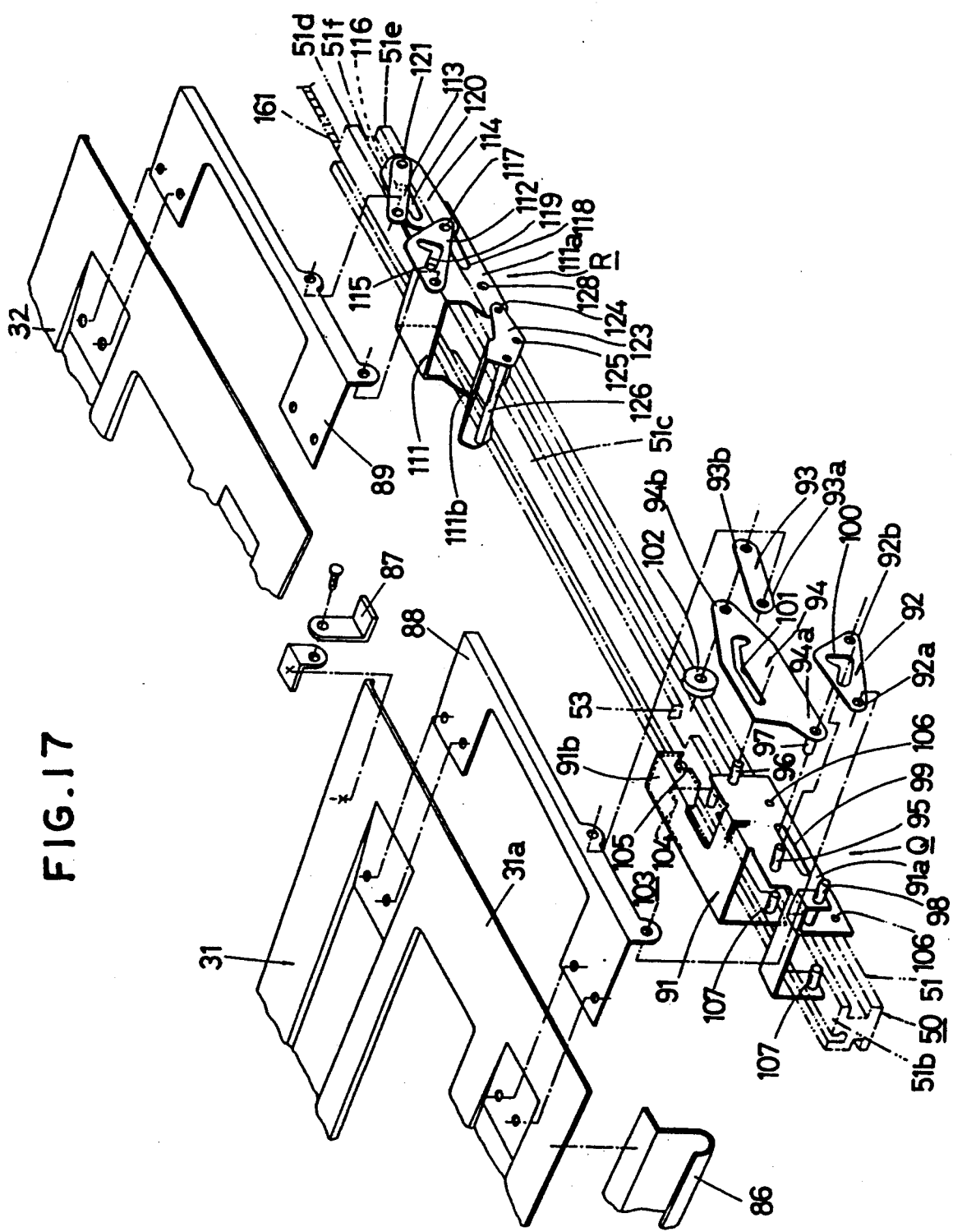

As shown in FIG. 17, the engaging pin 98 mounted on the forward transfer device Q is for locking operation of the lock mechanism 60 of the position regulating device P. And the pin 98 is drivable by means of a motor unit 160 disposed at a forward end portion of the flexible top 30, thereby opening or closing the roof opening 10 with the flexible top 30. The pin 98 is located at a forward end portion of the opening portion 48 as shown in FIG. 21 when the flexible top 30 is located at a position to close the opening portion 48—this position of the flexible top 30 will be referred to as a "closed posture" and the position of the pin 98 will be referred to as a "forward end position" when the flexible top 30 is in the closed posture, on the one hand—while the pin 98 is located at a position around the forward end of the first rail 51 when the flexible top 30 opens the opening portion 48 as shown in FIGS. 15 and 21—this position of the flexible top 30 will be referred to as an "open posture" and the position of the pin 98 will be referred to as an "intermediate position" when the flexible top 30 is in the open posture, on the other hand. Thus, when the flexible top 30 transfers between the closed and open postures, the pin 98 moves between the forward end position and intermediate position. When the flexible top 30 is in the open posture, as shown in FIG. 15, the pin 98 is located at a position around a mouth portion of the guide groove 68 of the lock mechanism 60 so as to correspond to the third convex portion 74 of the first lever 66 in the engaged posture. When the board member 20 is transferred from the second posture P2 to the third posture P3, the pin 98 is further transferred rearwardly from its intermediate position to be engaged with the third convex portion 74 of the first lever 66 and disposed at a groove end position of the guide groove 68 as shown in FIG. 16. The position of the pin 98 will be referred to as a "rearward end position" at this time. Briefly speaking, the pin 98 can be transferred so as to selectively take one of the three positions.

Operation of the lock mechanism 60 will be described. As shown in FIG. 15, when the flexible top 30 is in the open posture, the pin 98 is set at the intermediate position and the first lever 66 is pivotted by means of the pin 98 in the direction as indicated by the arrow a in the draing so as to be located in the engaged posture. In this case, the second convex portion 73 of the first lever 66 is engaged with the first convex portion 75 of the second lever 67 so as to regulate the pivotal movement of the first lever 66 in the direction as shown by the arrow b in the drawing, namely, the pivotal movement in the direction in which the first convex portion 72 is disengaged from the striker 62. Thus, in this state, as the flexible top 30 is operated to be closed, the pin 98 is transferred from its intermediate position to its forward end position to retain the state in which the first convex portion 72 is engaged with the striker 62.

On the one hand, when the board member 20 on which the flexible top 30 is placed in a folded state (FIG. 22) is moved from the state as shown in FIG. 15, i.e., from the state where the board member 20 is located in the second posture P2, to the third posture P3 as shown in FIG. 23, the pin 98 is further moved rearwardly from its intermediate position to its rearward end position. As it is moved up to its rearward end position, the pin 98 is brought into abutment with the second convex portion 76 of the second lever 67 and it pivots the second lever 67 in the direction as indicated by the arrow d in FIG. 16 to allow the second lever 67 to take its disengaged posture. This operation disengages the first convex portion 75 of the second lever 67 from the second convex portion 73 of the first lever 66, and the first lever 66 moves from the engaged posture to the disengaged posture to thereby disengage the first guide rail 51 from the second guide rail 52 and permit a pivotal movement of the board member 20 in the direction as indicated by the arrow m in the drawing by means of the pivoting mechanism S.

On the other hand, when the board member 20 is moved from the third posture P3 to the second posture P2, the elements as have been described hereinabove are located as shown in FIG. 16 when the board member 20 is in the third posture P3. When the pin 98 is moved from this position to the intermediate position and the flexible top 30 is set at the open posture, the pin 98 is brought into abutment with the third convex portion 74 of the first lever 66 again and the first lever 66 is engaged again to take the engaged posture (the posture as shown in FIG. 15). Accordingly, at the time when the board member 20 is returned from the third posture P3 to the second posture P2, for instance, even if the first guide rail 51 is not aligned or matched with the second guide rail 52 in a coaxial manner, the lock mechanism 60 is operated to ensure a correct relative alignment between the first and second guide rails 51 and 52 in their vertical and axial directions, thereby setting them at a given position and aligning coaxially the first guide rail 51 with the second guide rail 52 with high accuracy.

In this embodiment, an abutting piece 71 is provided at a forward end portion of the lock bracket 63 so as to come into abutment with an inner surface of the striker bracket 61 when the board member 20 is moved from the third posture P3 to the second posture P2, thereby permitting a preliminary alignment of the positions of the guide rails 51 and 52 in the transverse direction of the rail.

It is further to be noted that, although the lock mechanism 60 which is provided to lock the board member 20 is connected and fixed to a member on the side of the vehicle body, such as the first guide rail 51, in this embodiment, the lock mechanism 60 may be used as a flexible top fixing mechanism by constituting it so as to enable an engagement of the first convex portion 72 of the first lever 66 with an engageable pin (not shown) on the side of the canvas top support base mounted on the trunk lid 8 when the board member 20 is located in the third posture P3.

Engagement Mechanism

As shown in FIGS. 14 and 15, the engagement mechanism 80 comprises a projection 81 in a conical shape formed within a forward end surface 52b of the second guide rail 52 and a concave portion 82 in a conical shape formed on the rearward end surface 51b of the first guide rail 51. The engagement mechanism 80 is capable of aligning the positions of the surfaces of the first and second guide rails 51 and 52, respectively, on which they are matched with each other, by engaging the convex projection 81 with the concave portion 82 or interlocking the former with the latter, when the board member 20 is transferred from the third posture P3 to the second posture P2. In other words, the engagement mechanism 80 is to align the matching surface of the first guide rail 51 with the other matching surface of the second guide rail 52 while the lock mechanism 60 is mounted. It is to be noted that, since the engagement mechanism 80 is provided directly on the guide rail 50 consisting the first and second guide rails 51 and 52, respectively, a more accurate alignment of the positions of the two guide rails than the lock mechanism 60 can be achieved.

The accurate alignment of the first guide rail 51 with the second guide rail 52 constituting the guide rail 50 by means of the position regulating device P consisting of the lock mechanism 60 and the engagement mechanism 80 ensures a smooth transfer of the flexible top 30 and facilitates an integral arrangement for the guide rail.

Flexible Top

Figure 30:
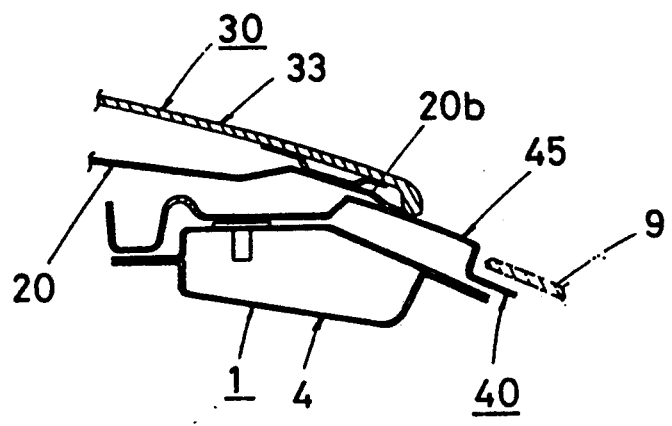
Figure 31:
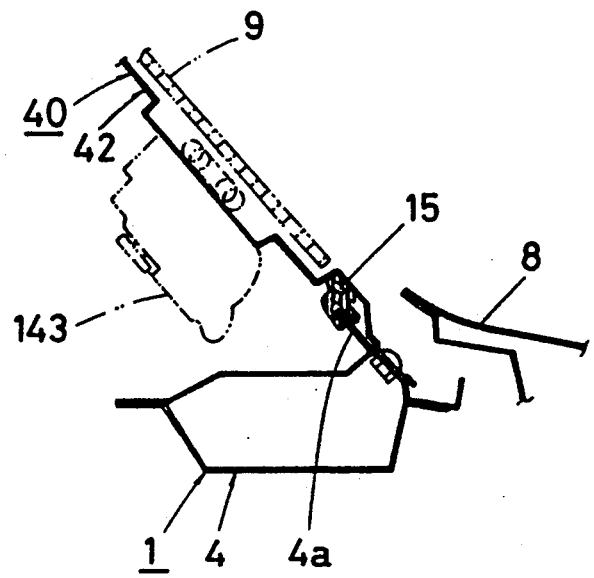
Figure 32:
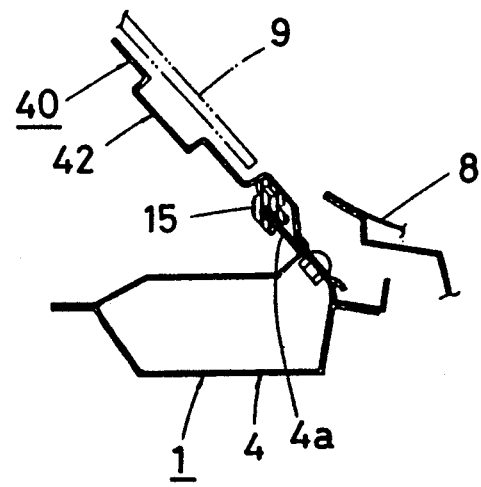

As have been described hereinabove, the flexible top 30 is to cover the roof opening 48 of the roof 2. As shown in FIGS. 21 to 24 and 42 to 45, the flexible top 30 comprises a combination of a hard member with a soft member, namely, three sheets of first, second, and third panels 31, 32, and 33, respectively, and two sheets of canvases 34 and 35. The first panel 31 has the largest area and is disposed on a forward side of the vehicle body, the third panel 33 has the smallest area and is disposed on a rearward side of the body, and the second panel 32 has an intermediate area, i.e., an area smaller than the first panel 31 and larger than the third panel 33 and is disposed in between the first and third panels 31 and 33. The first panel 31 is connected to the second panel 32 so as to be movable with respect to the guide rail 50 by means of a forward transfer device Q and a rearward transfer device R, as will be described more in detail hereinbelow with respect to FIGS. 17, 19, and 20, while the third panel 33 of the flexible top 30 is fixed at its rearward end portion to the rearward end portion 20b of the board member 20, as shown in FIG. 30. The first and second panels 31 and 32 are extended by means of the forward transfer device Q and the rearward transfer device R so as to be located at a position at which the opening 48 is closed with the flexible top 30, in other words, at a closed position, as shown in FIGS. 21 and 24, while they are contracted or folded and placed on the board member 20 as shown in FIG. 22 so as to be located at a position at which the opening 48 is opened, in other words, at an open position.

Referring to FIGS. 25 to 29, when the flexible top 30 is located at the closed position, both side edge portions of each of the first, second, and third panels 31, 32, and 33, respectively, are disposed in abutment with a sealing material 16 mounted on a circumferential edge portions of the opening 48 of the base frame 40 to seal the opening 48 thereof. At each of side end portions of the first, second, and third panels 31, 32, and 33, respectively, is disposed a wire 17 in the longitudinal direction of the body so as to interconnect the first panel 31 to the second panel 32 which, in turn, is interconnected to the third panel 33. The wire 17 is further connected to each side edge portion of the canvases 34 and 35, although not shown, to transmit its pushing force applied by the panels 31 to 33 so as to allow the side edge portion to abut with the sealing material 16, thereby ensuring sealing property.

The construction and action of the canvases 34 and 35 will be described with reference to a description on operation of the flexible top 30 in association with operation of the board member 20.

Forward Transfer Device And Rearward Transfer Device

As shown in FIG. 17 the forward transfer device Q has substantially the same basic structure as the rearward transfer device R. The forward transfer device Q is mounted to the first panel 31 of the flexible top 30, while the rearward transfer device R is mounted to the second panel 32 thereof. They move the first panel 31 and the second panel 32 along the guide rail 50 and, at the same time, serve as lifting up the panels 31 and 32, respectively, at the time of start of transfer in order to disengage the panels 31 and 32 from the sealing material 16.

Forward Transfer Device:

As shown in FIG. 17, the forward transfer device Q comprises a sliding body 91 which is movably mounted to the guide rail 50 (first and second guide rails 51 and 52, respectively) through guide pins 106 and 107, respectively. The sliding body 91 is connected to a top end portion of the cable 161 to be operated to be pushed or pulled by means of a motor unit 160 mounted in a middle portion in the transverse direction of the board member 20 to thereby move on the guide rail 50 in the longitudinal direction of the body in response to a displacement force of the cable 161. The motor unit 160 has substantially the same structure as the motor unit 143.

As shown further in FIG. 17, the sliding body 91 is shown to comprise a first guide groove 99 disposed on its outer side surface 91a extending in the longitudinal direction of the vehicle body and three engaging pins, namely, the engaging pin 98 for locking operation to regulate operation of the position regulating device P as have been described hereinabove, and first and second engaging pins 95 and 96, respectively. The sliding body 91 is further provided at its rearward end portion 91b with an engagement portion 103 consisting of two engaging surfaces 104 and 105 which are detachably engageable with a sliding pin 126 of the rearward transfer device R as will be described more in detail hereinbelow.

The sliding body 91 is "link-engaged" with a bracket 88 mounted to a side edge portion 31a of the first panel 31 through three links, namely, a first link 92 with a second guide groove 100 in an approximately C-letter shape formed inside, a second link 93 in a band-like form, and a third link 94 with a third guide groove 101 in an arch-like curved shape formed inside. The first link 92 is pivotably supported at its one end 92a on a forward end portion of the bracket 88 through a connecting pin 108 (FIG. 18) when the sliding body 91 is in a state in which its engaging pin 95 is engaged in the second guide groove 100. Furthermore, the first link 92 is engaged at its other end 92b with the first guide groove 99 through the third engaging pin 97 together with one end 94a of the third link 94. The second link 93 is pivotably supported at its one end 93a on a middle portion of the bracket 88 through a connecting pin 109 (FIG. 18) and it is relatively rotatably connected at its other end 93b to an other end 94b of the third link 94 through a connecting pin 110 (FIG. 18) to which a guide roller 102 is connected. The second engaging pin 96 is engaged in the third groove 101 of the third link 94.

Referring now to FIG. 18, the forward transfer device Q is brought into a state that regulates its movement in the longitudinal direction of the body by engaging the guide roller 102 into a first cut-out portion 53 formed in the first guide rail 51 when the sliding body 91 is in a state in which it is located at a top end portion of the first guide rail 51 (i.e., when the flexible top 30 is in the closed posture, namely, in the first posture, P1). In this state, the third engaging pin 97 is located on the rearward end side of the first guide groove 99 and the first engaging pin 95 is located on the forward end side of the second guide groove 100 while the second engaging pin 96 is located on the forward end side of the third guide groove 101. The second guide groove 100 in this state is disposed so as to extend in a vertical direction while the third guide groove 101 is disposed such that its forward half portion extends in an approximately horizontal direction and its rearward half portion extends in an obliquely downward direction.

Rearward Transfer Device:

As shown in FIGS. 17 to 20, the rearward transfer device R has a structure that is substantially the same as the forward transfer device Q. The rearward transfer device R has a sliding body 111 which is movably mounted to the guide rail 50 through a guide pin 128. The sliding body 111 is provided with a first guide groove 118 on its outer side surface 111a and is pivotably connected to a bracket 89 mounted to the second panel 32 through a first link 112 having a second guide groove 119, a second link 113 and a third link 114 having a third guide groove 120. Like the forward transfer device Q, a first engaging pin 115 mounted on the sliding body 111 is engaged with the second guide groove 119 of the first link 112 and a second engaging pin 116 mounted on the sliding body 111 is engaged with the third guide groove 120 of the third link 114. A structure of the rearward transfer device R different from the forward transfer device Q is such that an inclination portion of the third link 114 is shorter than that of the third guide groove 101 of the forward transfer device Q, that an engaging pin 121 connecting the second link 113 to the third link 114 is engaged with a third cut-out portion 55 formed in an upper flange 51a of the first guide rail 51, as shown in FIG. 19, when the flexible top 30 is located in the first posture P1, and that an arm 123 is pivotably mounted to an end portion of the sliding body 111 through a fulcrum pin 124, the arm 123 comprising an engaging pin 125 and a sliding pin 126. The engaging pin 125 is engaged with a second cut-out portion 54 formed in a lower flange 51e of the first rail 51 as shown in FIG. 18, when the flexible top 30 is in the first posture P1, and it is engaged with a concave groove 51f of the first rail 51 when the flexible top 30 is in a posture other than the first posture P1. The sliding pin 126 is disposed always over or astride an upper surface 51c of the first guide rail 51 in the transverse direction of the body. The engaging pin 125 is in a position to be engaged with the engaging portion 103 of the forward transfer device Q when it is in the concave groove 51f of the first guide rail 51. When the flexible top 30 is in the first posture P1, an engagement of the engaging pin 121 with a third cut-out portion 55 of the first guide rail 51 and of the engaging pin 125 with a second cut-out portion 54 regulates a movement of the rearward transfer device R in the longitudinal direction of the body. It is further to be noted that the rearward transfer device R is provided with no driving means unlike the forward transfer device Q.

Operation:

The opening or closing of the flexible top 30 connected to the guide rail 50 through the forward and rearward transfer devices Q and R is effected by means of operation of the forward and rearward transfer devices Q and R, respectively.

When the flexible top 30 is in the first posture P1 as shown in FIGS. 21 and 24, the forward transfer device Q is located at the forward end portion 51b of the first guide rail 51 and the first panel 31 is disposed substantially in parallel to and close to the first guide rail 51 as shown in FIG. 18, and the base frame 40 is sealed at its outer circumferential portion. The rearward transfer device R is located in a vicinity of the rearward end portion 51a of the first guide rail 51 as shown in FIGS. 19 and 24, while the second panel 32 is disposed substantially in parallel to and close to the first guide rail 51 like the first panel 31. In the first posture P1 of the flexible top 30, the forward and rearward transfer devices Q and R are engaged with the guide rail 50 in a vertical relationship so that, even if a sucking action would work, the flexible top 30 can be effectively prevented from fluttering, thereby improving durability of the flexible top 30.

As the flexible top 30 is operated to be opened from this posture, namely, as the cable 161 is operated to be pulled by means of the motor unit 160, the sliding body 91 of the forward transfer device Q is moved toward the rear of the body respective to the bracket 88, thus displacing the third engaging pin 97 within the first guide groove 99 from the forward end side toward the rearward end side. During the first half period of this displacement, on the one hand, the first engaging pin 95 is first transferred within the second guide groove 100 toward the rearward end side to thereby pivot the first link 92 in a direction in which it erects. During the second half period of this displacement, on the other hand, the second engaging pin 96 is moved in the inclination portion of the third guide groove 101 toward the rearward end side, thereby pivotting the third link 94 upwardly about the third engaging pin 97 and removing the guide roller 102 from the first cut-out portion 53 of the first guide rail 51 followed by moving onto the upper surface 51c, as shown in FIG. 19. In this state, the first panel 31 is lifted up as a whole and disengaged from the circumferential edge portion of the base frame 40. It is to be noted in this embodiment that, as a magnitude of the height of the second guide groove 100 of the first link 92 between prior to and subsequent to the pivotal movement is set to become smaller than that of the third guide groove 101 of the third link 94, the bracket 88 can be inclined toward the front of the body.

When the cable 191 is further pulled, the forward transfer device Q as it is in the posture as shown in FIG. 19 is further moved toward the rear of the body while folding the first canvas 34 of the flexible top 30. Then, when the forward transfer device Q comes at a position forward of and close to the rearward transfer device R, the sliding pin 126 mounted on the arm 123 of the rearward transfer device R is allowed to be engaged with the engaging portion 103 of the forward transfer device Q. The arm 123 is then pivoted upwardly while being guided on the first engaging surface 104 as the forward transfer device Q moves. As a result, the engaging pin 125 is removed from the second cut-out portion 54 of the first guide rail 51 and transferred into the concave groove 51d, thereby integrally connecting the forward transfer device Q to the rearward transfer device R.

When the forward transfer device R is further transferred in the rearward direction, the sliding body 111 of the rearward transfer device R is moved further toward the rear of the body, too, with respect to the bracket 89 and, like the forward transfer device Q, the second panel 32 is removed from the sealing surface of the base frame 40 and brought into a state as shown in FIG. 20. In this state, the forward transfer device Q is arranged such that, when a difference of the height of the first engaging pin 115 of the first link 112 between prior to and subsequent to its pivotal movement is appropriately set respective to that of the third guide groove 120 of the third link 114, and the second panel 32 is set to become approximately parallel to the first guide rail 51. Thus, in the state in which the forward transfer device Q is connected to the rearward transfer device R, the first panel 31 is inclined at an angle different from the second panel 32 so that the fist and second panels 31 and 32 are allowed to be folded in a vertical direction and accommodated while ensuring a sufficient space in which the first canvas 34 of the flexible top 30 can be accommodated.

The cable 161 is further pulled to allow the forward transfer device Q and the rearward transfer device R to integrally move toward the rear of the body while folding the second canvas 35. The forward and rearward transfer devices Q and R are then transferred from the first guide rail 51 to the second guide rail 52 and accommodated on the board member 20 in the second posture P2 as shown in FIG. 22. In this posture P1, the first panel 31 is folded over the second panel 32 which, in turn, is folded over the third panel 33. And the first canvas 34 is folded in between the first and second panels 31 and 32, and the second canvas 35 is folded in between the second and third panels 32 and 33. This state enables the flexible top 30 to be folded in a short width dimension in the longitudinal direction of the vehicle body and in a low height dimension in the vertical direction thereof, thereby improving aerodynamic characteristics and appearance of the body. In particular, the low height dimension of the flexible top 30 in the folded state provides the driver with a wide field of backward vision when the flexible top 30 placed on the board member 20 is transferred and accommodated on the trunk lid 8 as shown in FIG. 23. As shown in FIGS. 21 to 23, it is to be noted that a guide member 36 is mounted at rearward end portions of the first and second panels 31 and 32 in order to prevent the first and second canvases 34 and 35, respectively, from being folded at sharp angles.

When the flexible top 30 is operated to close the opening 48 by being transferred forwardly from the second posture P2 to the first posture P1, the forward transfer device Q and the rearward transfer device R are transferred together in a joined state up to a given position in the first posture P1, namely, up to the position where the engaging pin 125 of the rearward transfer device R reaches the position of the second cut-out portion 54 of the first guide rail 51. When the engaging pin 125 is engaged with the second cut-out portion 54 of the first guide rail 51, the arm 123 is caused to be pivoted downwardly removing or disengaging the sliding pin 126 from the engaging portion 103 of the forward transfer device Q. This disengages the forward transfer device Q from the rearward transfer device R. Thus, thereafter, only the forward transfer device Q advances toward the front of the body up to a given original position while leaving the rearward transfer device R behind, and the flexible top 30 is set in the first posture P1. While the forward and rearward transfer devices Q and R advance forwardly, the flexible top 30 is extended by developing first the elements to be located on the rearward side when closed, in other words, by developing the first, second, and third panels 31, 32, and 33 and at the same time the first and second canvases 34 and 35, respectively.

It is further to be noted that, as in this embodiment, when a lift-up mechanism of each of the forward and rearward transfer devices Q and R comprises a four-joint link mechanism and a cam mechanism composed of a guide groove disposed in each of the links and pins to be engageable therewith, a time required for lifting up the forward and rearward transfer devices Q and R can be shortened by a time period equivalent to the lift-up action by means of the cam mechanism, compared with a lift-up mechanism comprising a pivotable link only. This leads to shortening the time for opening or closing the flexible top 30. In this embodiment, as the lift-up mechanism for the flexible top 30 is composed of the link mechanism and the cam mechanism, as have been described hereinabove, the total lift-up dimension required by the forward and rearward transfer devices Q and R can be reduced by a lift-up dimension in which the lift-up dimension (i.e., a difference in height between the guide grooves prior to and subsequent to pivotal movement as have been described hereinabove) to be burdened by the cam mechanism is offset by the link mechanism. Furthermore, as the links are in a recumbent posture when the flexible top 30 is in the first posture P1, a vertical dimension of the forward and rearward transfer devices Q and R in the closed posture of the top 30 can be made smaller than a lift-up mechanism composed merely of the cam mechanism. This arrangement permits a larger clearance for heads of the driver and passengers when the height of the vehicle body is constant and provides a broader space in the vehicle chamber.

It is further to be noted that, in this embodiment, a lift-up operation of the forward and rearward transfer devices Q and R is carried out in all cases by means of the cable 161 alone, so that the lift-up mechanism as in this embodiment requires a force of operating the links to be lifted up from their recumbent posture to a lesser extent than the lift-up mechanism composed merely of the cam mechanism by setting shapes of the guide grooves so as to enable an efficient use. This serves as readily reducing a force required for operation and miniaturizing the device.

It is to be understood that the foregoing text and drawings relate to embodiments of the present invention given by way of examples but not limitation. Various other embodiments and modifications are possible within the spirit and scope of the present invention.

What is claimed is:

1. A flexible top apparatus of a vehicle, comprising:
   a roof panel connected to a vehicle body through at least a pair of left-hand and right-hand front pillars and a pair of left-hand and right-hand rear pillars;
   a roof opening provided in the roof panel leaving a front header, a pair of left-hand and right-hand roof side rails, and a rear header and surrounded by said front header, said left-hand and right-hand roof side rails, and said rear header;
   a rear window glass panel fixed to said left-hand and right-hand rear pillars and said rear header;
   a flexible top having a size as substantially large as the roof opening in a state in which said flexible top is unfolded and expanded in a longitudinal direction of the vehicle body and being disposed to selectively take a first posture in which the roof opening is closed and a second posture in which said flexible top is contracted or folded in a longitudinal direction of the body and placed at a position in a vicinity of said rear header to open the roof opening; and
   a board member disposed underneath said flexible top located in the second posture for supporting said flexible top located in the second posture; and
   a guide means disposed between said board member and the body for movably guiding said board member and said flexible top supported by said board member between said second posture and a third posture located rearward of said second posture.

2. A flexible top apparatus as claimed in claim 1, wherein said third posture is located in a vicinity of a lower end portion of said rear window glass panel.

3. A flexible top apparatus as claimed in claim 2, wherein a trunk lid is disposed at a position as approximately high as the lower end portion of said rear window glass panel and rearward of said rear window glass panel; and
   a support base for supporting said board member in the third possture is disposed on an upper surface of said trunk lid.

4. A flexible top apparatus as claimed in claim 1, wherein said guide means comprises a forward link and a rearward link, each disposed pivotably in the longitudinal direction of the body;
   wherein said forward link is pivotably mounted at its one end portion to the vehicle body and at its other end portion to a forward end portion to said board member; and
   said rearward link is pivotably mounted at its one end portion to the vehicle body and at its other end portion to a rearward portion of said board member.

5. A flexible top apparatus as claimed in claim 4, further comprising a driving means for driving said board member between said second posture and said third posture;
   wherein said forward link and said rearward link are pivotted in the longitudinal direction of the vehicle body by means of said driving means.

6. A flexible top apparatus as claimed in claim 4, wherein said one end portion of said rearward link is pivotably mounted to the body in a vicinity of the lower portion of said rear window glass panel.

7. A flexible top apparatus as claimed in claim 1, wherein said guide means comprises:

a guide rail mounted to the vehicle body along said rear pillar from a rearward end portion of said roof side rail;

a sliding body retained slidably on said guide rail; and a forward link and a rearward link, each mounted pivotably in the longitudinal direction of the body;

wherein said forward link is pivotably mounted at its one end portion to said sliding body and at its other end portion to a forward end portion of said board member;

said rearward link is pivotably mounted at its one end portion to the body and at its other end portion to a rearward end portion of said board member; and said sliding body moves along said guide rail to pivot said forward link and said rearward link in the longitudinal direction of the vehicle body and to move said board member between said second posture and said third posture.

8. A flexible top apparatus as claimed in claim 7, wherein said rearward link is pivotably mounted at its one end portion to the body in a vicinity of the rear window glass panel.

9. A flexible top apparatus as claimed in claim 7, further comprising a driving means for driving said sliding body along said guide rail.

10. A flexible top apparatus as claimed in claim 1, further comprising:
   a first driving means for driving said flexible top between said first posture and the second posture; and
   a second driving means for driving said board member between said second posture and said third posture.

11. A flexible top apparatus as claimed in claim 10, wherein said first driving means is mounted to said board member.

12. A flexible top apparatus as claimed in claim 1, further comprising:
   a first guide rail disposed forward of the forward end portion of said board member located in said second posture along said roof side rail for guiding said flexible top between said first posture and said second posture; and
   a second guide rail disposed on said board member so as to fit together with said first guide rail when said board member is located in said second posture for guiding said flexible top in the longitudinal direction thereof.

13. A flexible top apparatus as claimed in claim 12, further comprising a position regulating means for aligning said first guide rail with said second guide rail when said flexible top and board member are located in said second posture.

14. A flexible top apparatus as claimed in claim 13, wherein said position regulating means is provided with a lock mechanism for locking said board member at a given position when said board member is transferred from said third posture to said second posture.

15. A flexible top apparatus as claimed in claim 14, wherein said lock mechanism comprises:
   an operating piece mounted to said flexible top;
   a first engaging member mounted to the body and provided with a first engaging portion;
   a second engaging member mounted to said board member and provided with a second engaging portion engageable with said first engaging portion of said first engaging member;
   a locking piece mounted to said second engaging member for bringing into a state of engagement of said second engaging portion with said first engaging portion of said first engaging member through engagement with said operating piece when said flexible top is transferred from said second posture to said first posture and for retaining this state of engagement; and
   a disengaging piece mounted to said second engaging member for releasing engagement with said first engaging portion of said first engaging member when said flexible top is transferred from said second posture to said third posture.

16. A flexible top apparatus as claimed in claim 13, wherein said position regulating means comprises:
   a first engaging portion mounted to a rearward end portion of said first guide rail; and
   a second engaging portion mounted to a forward end portion of said second guide rail to be engageable with said first engaging portion when said board member is transferred from said third posture to said second posture.

17. A flexible top apparatus as claimed in claim 16, wherein:
   said first engaging portion mounted to said first guide rail is provided with a concave portion having opening toward the rear of the body; and
   said second engaging portion mounted to said second guide rail is provided with a projection which projects forwardly and which is fitted together with said concave portion.

18. A flexible top apparatus as claimed in claim 1, wherein a rearward end portion of said flexible top is fixed to the rearward end portion of said board member.

19. A flexible top apparatus as claimed in claim 18, further comprising:
   a first driving means mounted to said board member for driving said flexible top between said first posture and said second posture; and
   a second driving means disposed in a vicinity of the lower end portion of said rear window glass panel for driving said board member between said second posture and said third posture.

20. A flexible top apparatus as claimed in claim 18, further comprising:
   a guide rail extending from the forward end portion of said board member located in the second posture to a position in a vicinity of said front header along said roof side rail; and
   a sliding body slidable along said guide rail;
   wherein said sliding body is connected to the forward end portion of said flexible top; and
   said sliding body is transferred from said guide rail to said board member when said flexible top is transferred from said first posture to said second posture.

* * * * *